United States Patent
Liu et al.

(10) Patent No.: US 12,490,159 B2
(45) Date of Patent: Dec. 2, 2025

(54) NETWORK HANDOVER METHOD AND APPARATUS, DEVICE, AND STORAGE MEDIUM

(71) Applicant: ZTE CORPORATION, Shenzhen (CN)

(72) Inventors: Hongjun Liu, Shenzhen (CN); Wei Ma, Shenzhen (CN); Dongmei Li, Shenzhen (CN); Wu Wen, Shenzhen (CN); Boshan Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 459 days.

(21) Appl. No.: 17/918,537

(22) PCT Filed: Apr. 15, 2021

(86) PCT No.: PCT/CN2021/087363
§ 371 (c)(1),
(2) Date: Oct. 12, 2022

(87) PCT Pub. No.: WO2021/218644
PCT Pub. Date: Nov. 4, 2021

(65) Prior Publication Data
US 2023/0345316 A1    Oct. 26, 2023

(30) Foreign Application Priority Data
Apr. 26, 2020    (CN) .......................... 202010340735.4

(51) Int. Cl.
*H04W 36/00* (2009.01)
*H04W 36/08* (2009.01)
*H04W 36/14* (2009.01)

(52) U.S. Cl.
CPC ... *H04W 36/033* (2023.05); *H04W 36/00838* (2023.05); *H04W 36/08* (2013.01); *H04W 36/1443* (2023.05); *H04W 36/00698* (2023.05)

(58) Field of Classification Search
CPC ......... H04W 36/033; H04W 36/00838; H04W 36/08; H04W 36/1443; H04W 36/00698;
(Continued)

(56) References Cited

U.S. PATENT DOCUMENTS 5,852,630 A * 12/1998 Langberg ............ H04L 27/2647
375/219
9,497,669 B2    11/2016 Choi-Grogan
(Continued)

FOREIGN PATENT DOCUMENTS

CN    102196520 A    9/2011
CN    108924884 A    11/2018
(Continued)

OTHER PUBLICATIONS

Australian Office Action for Application No. 2021265948, dated Jun. 21, 2023, 5 pages.
(Continued)

*Primary Examiner* — Kenneth T Lam
(74) *Attorney, Agent, or Firm* — Morgan, Lewis & Bockius LLP

(57) ABSTRACT

Provided are a network handover method and apparatus, a device, and a storage medium. The method is applied to a first communication node and includes: a handover required message is sent to a core network, where the handover required message carries reference information of UE context at a source side; and a handover control message sent by the core network is received, where the handover control message carries information for maintaining the UE context at the source side, and the information for maintaining the (Continued)

UE context at the source side is used for instructing a network node at the source side not to release resources used by a UE, and the information for maintaining the UE context at the source side is determined by the reference information of the UE context at the source side.

13 Claims, 10 Drawing Sheets

(58) Field of Classification Search
CPC ......... H04W 36/0033; H04W 36/0058; H04W 28/26
See application file for complete search history.

(56) References Cited

U.S. PATENT DOCUMENTS

| | | | |
|---|---|---|---|
| 2011/0216735 A1 | 9/2011 | Venkatachalam et al. | |
| 2015/0003243 A1 | 1/2015 | Klingenbrunn et al. | |
| 2019/0124181 A1 | 4/2019 | Park et al. | |
| 2019/0289506 A1* | 9/2019 | Park | H04W 36/0044 |
| 2019/0313412 A1 | 10/2019 | Baldemair et al. | |
| 2020/0022039 A1* | 1/2020 | Kadiri | H04W 36/0079 |
| 2020/0120552 A1* | 4/2020 | Yang | H04W 36/0069 |
| 2020/0275330 A1* | 8/2020 | Tang | H04W 8/08 |
| 2020/0314913 A1* | 10/2020 | Rastegardoost | H04W 36/0064 |
| 2021/0235334 A1* | 7/2021 | Purkayastha | H04W 36/00222 |
| 2021/0289402 A1* | 9/2021 | Ke | H04W 36/0066 |
| 2022/0279401 A1* | 9/2022 | Wallentin | H04W 76/30 |
| 2022/0303840 A1* | 9/2022 | Chang | H04W 12/041 |
| 2022/0394581 A1* | 12/2022 | Kim | H04W 36/0033 |
| 2023/0053069 A1* | 2/2023 | Ohlsson | H04W 36/0005 |
| 2023/0059975 A1* | 2/2023 | Wu | H04W 36/0079 |
| 2023/0108496 A1* | 4/2023 | Ohlsson | H04W 36/185 370/329 |
| 2023/0110446 A1* | 4/2023 | Ohlsson | H04W 36/362 455/442 |
| 2023/0180074 A1* | 6/2023 | Ma | H04W 76/20 370/331 |
| 2023/0262545 A1* | 8/2023 | Stanczak | H04W 36/0079 370/331 |
| 2023/0276311 A1* | 8/2023 | Wu | H04W 36/00 370/331 |
| 2024/0172066 A1* | 5/2024 | Hong | H04W 36/36 |

FOREIGN PATENT DOCUMENTS

| | | |
|---|---|---|
| CN | 110731101 A | 1/2020 |
| CN | 112512086 A | 3/2021 |
| CN | 112512087 A | 3/2021 |
| TW | 202014004 A | 4/2020 |
| WO | WO2018/085416 A1 | 5/2018 |
| WO | WO2018231136 A1 | 12/2018 |
| WO | WO 2019/030981 A1 | 2/2019 |
| WO | WO2020001226 A1 | 1/2020 |
| WO | 2020040546 A1 | 2/2020 |
| WO | 2020076599 A1 | 4/2020 |
| WO | WO 2021/015579 A1 | 1/2021 |

OTHER PUBLICATIONS

Search Report in Chinese Application No. 2020103407354, dated Sep. 18, 2024, 5 pages, including translation.
First Office Action in Chinese Application No. 202010340735.4, dated Sep. 24, 2024, 18 pages, including translation.
International Search Report in Application No. PCT/CN2021/087363, dated Jul. 8, 2021, 4 pages including English translation.
Office Action for Australian Application No. 2021265948, dated Oct. 19, 2023, 11 pages.
Catt, "(CR for TS 36.413) Support of Inter-MN handover without SN change", R3-195281, 3GPP TSG-RAN WG3 #105-Bis, Chongqing, China, Oct. 14-18, 2019, 26 pages.
Catt, "(CR for TS 38.413) Support of Inter-MN handover without SN change", R3-195282, 3GPP TSG-RAN WG3 #105-Bis, Oct. 14-18, 2019, 18 pages.
Extended European Search Report for Application No. 21795510.3, dated Apr. 25, 2024, 12 pages.
Huawei, "Inter-RAT HO from SA to EN-DC with shared gNB/sgNB", 3GPP TSG-RAN3 Meeting #105-e, R3-201066, E-Meeting, Feb. 24-Mar. 6, 2020, 3 pages.
Huawei, "Inter-system HO from EN-DC to SA with shared SgNB/gNB", 3GPP TSG-RAN3 Meeting #107-e, R3-200670, E-Meeting, Feb. 24-Mar. 6, 2020, 3 pages.
"3rd Generation Partnership Project; Technical Specification Group Radio Access Network; Evolved Universal Terrestrial Radio Access (E-UTRA) and NR; Multi-connectivity; Stage 2 (Release 16)", 3GPP Draft; 37340-G10, 3rd Generation Partnership Project (3GPP), Mobile Competence Centre ; 650, Route Des Lucioles ; F-06921 Sophia-Antipolis Cedex ; France Apr. 7, 2020.
Third Office Action in Chinese Application No. 202010340735.4, dated Aug. 15, 2025, 12 pages, including translation.

* cited by examiner

NETWORK HANDOVER METHOD AND APPARATUS, DEVICE, AND STORAGE MEDIUM

CROSS REFERENCE TO RELATED APPLICATIONS

This application is a national stage application filed under 35 U.S.C. 371 based on International Patent Application No. PCT/CN2021/087363, filed on Apr. 15, 2021, which claims priority to Chinese Patent Application No. 202010340735.4 filed with the CNIPA on Apr. 26, 2020, disclosures of which are incorporated herein by reference in their entireties.

TECHNICAL FIELD

The present application relates to the technical field of communications, and for example, to a network handover method and apparatus, a device, and a storage medium.

BACKGROUND

A target 5th generation mobile communication technology (5G) base station after handover of a user equipment (UE) may be the same 5G base station as a secondary node (SN) in an evolved universal terrestrial radio access and new radio-dual connectivity (EN-DC) network before handover, and the UE may continue to use original radio resources. The secondary node (SN) in the EN-DC network after handover of the UE may be the same 5G base station as the 5G base station before handover, and the UE may continue to use the original radio resources. How to enable the 5G base station before handover of the UE to know that the base station is the same before and after the handover and to reserve the radio resources of the UE is a problem to be solved.

SUMMARY

The present application provides a network handover method and apparatus, a device, and a storage medium.

An embodiment of the present application provides a network handover method. The network handover method is applied to a first communication node and includes the following. A handover required message is sent to a core network, where the handover required message carries reference information of UE context at a source side; and a handover control message sent by the core network is received, where the handover control message carries information for maintaining the UE context at the source side, and the information for maintaining the UE context at the source side is used for instructing a network node at the source side not to release resources used by a UE, and the information for maintaining the UE context at the source side is determined by the reference information of the UE context at the source side.

An embodiment of the present application provides a network handover method. The network handover method is applied to a second communication node and includes the following. A handover request message sent by a core network is received, where the handover request message carries reference information of UE context at a source side; and a handover request acknowledge message is sent to the core network, where the handover request acknowledge message carries information for maintaining the UE context at the source side, the information for maintaining the UE context at the source side is used for instructing a network node at the source side not to release resources used by a UE, and the information for maintaining the UE context at the source side is determined by the reference information of the UE context at the source side.

An embodiment of the present application provides a network handover method. The network handover method is applied to a third communication node and includes the following. A third message is received, where the third message carries radio resource indication information; and part or all of radio resources of a source cell are reserved according to the radio resource indication information.

An embodiment of the present application provides a network handover apparatus. The network handover apparatus is configured at a first communication node and includes a first sending module and a first receiving module. The first sending module is configured to send a handover required message to a core network, where the handover required message carries reference information of UE context at a source side. The first receiving module is configured to receive a handover control message sent by the core network, where the handover control message carries information for maintaining the UE context at the source side, and the information for maintaining the UE context at the source side is used for instructing a network node at the source side not to release resources used by a UE, and the information for maintaining the UE context at the source side is determined by the reference information of the UE context at the source side.

An embodiment of the present application provides a network handover apparatus. The network handover apparatus is configured at a second communication node and includes a second receiving module and a second sending module. The second receiving module is configured to receive a handover request message sent by a core network, where the handover request message carries reference information of UE context at a source side. The second sending module is configured to send a handover request acknowledge message to the core network, where the handover request acknowledge message carries information for maintaining the UE context at the source side, the information for maintaining the UE context at the source side is used for instructing a network node at the source side not to release resources used by a UE, and the information for maintaining the UE context at the source side is determined by the reference information of the UE context at the source side.

An embodiment of the present application provides a network handover apparatus. The network handover apparatus is configured at a third communication node and includes a third receiving module and a reservation module. The third receiving module is configured to receive a third message, where the third message carries radio resource indication information. The reservation module is configured to reserve part or all of radio resources of a source cell according to the radio resource indication information.

An embodiment of the present application provides a device. The device includes one or more processors and a memory. The memory is configured to store one or more programs. The one or more programs, when executed by the one or more processors, cause the one or more processors to implement any of the methods in the embodiments of the present application.

An embodiment of the present application provides a storage medium. The storage medium stores a computer program. The computer program, when executed by a processor, implements any of the methods in the embodiments of the present application.

With respect to the above embodiments and other aspects of the present application and implementations thereof, further description is provided in the brief description of drawings, detailed description and claims.

DETAILED DESCRIPTION

Embodiments of the present application will hereinafter be described with reference to the accompanying drawings.

The processes shown in the flowcharts of the accompanying drawings may be executed in a computer system, such as a set of computer-executable instructions. Moreover, while a logical order is shown in the flowcharts, in some cases, processes shown or described may be performed in a different order than herein.

Figure 1:
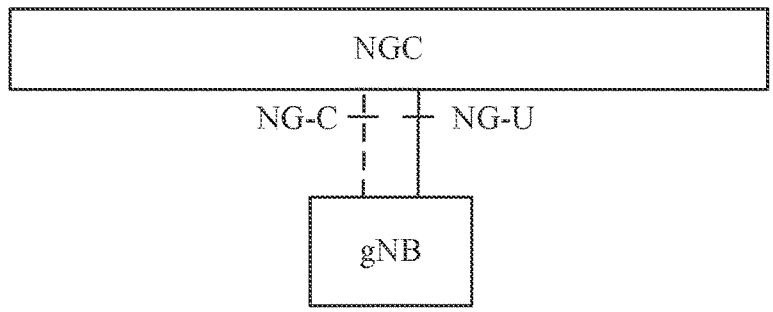
FIG. 1 is a schematic diagram of a 5G network architecture.

A base station (NG-RAN node, next generation node B (gNB)) of a 5G network can support high-capacity services (such as, a mobile broadband (MBB)). FIG. 1 is a schematic diagram of a 5G network architecture. As shown in FIG. 1, the 5G network includes a 5G core network (5 GC) and a 5G base station gNB. The 5GC includes a network element node such as an access mobility function (AMF) node, a session management function (SMF) node, and a user plane function (UPF) node. The 5G base station is also referred to as: the gNB, a next generation radio access network (NG-RAN) node. The 5G base station adopts a new physical layer air interface design, and the new physical layer air interface supports a new radio (NR), an NR radio access technology (RAT) standard base station, and a related base station network element interface. The 5G base station are connected to the 5GC (including a next generation-control plane (NG-C) (signaling) connection and a next generation-user plane (NG-U) (user data) connection) through a standardized next generation (NG) interface, while the NG-RAN base stations (gNBs or next generation-evolved NodeBs (NG-eNBs)) are connected to each other through an Xn interface (including an Xn-Control plane (Xn-C) connection and an Xn-User plane (Xn-U) connection).

The 5G may provide an MBB service, but the 5G network may not support voice service, that is, may not support a Voice over New Radio (VoNR) function under a 5G access. In this case, a mobile terminal, also referred to as a user equipment (UE), connected to the 5G network needs to be handed over to a 4G (long term evolution (LTE)) network to establish the voice service, and the 4G network generally supports a Voice over Long Term Evolution (VoLTE) function.

The 4G network includes a 4G core network, i.e., an evolved packet core (EPC) network and a 4G radio access network (long term evolution radio access network, LTE RAN), the EPC contains a basic network element node such as a mobility management entity (MME) node, a serving gateway (SGW) node, a public data network (PDN) Gateway (PGW) node, and the 4G radio access network (RAN) includes an interface between an evolved Node B (eNB) and an associated base station network element.

Figure 2:
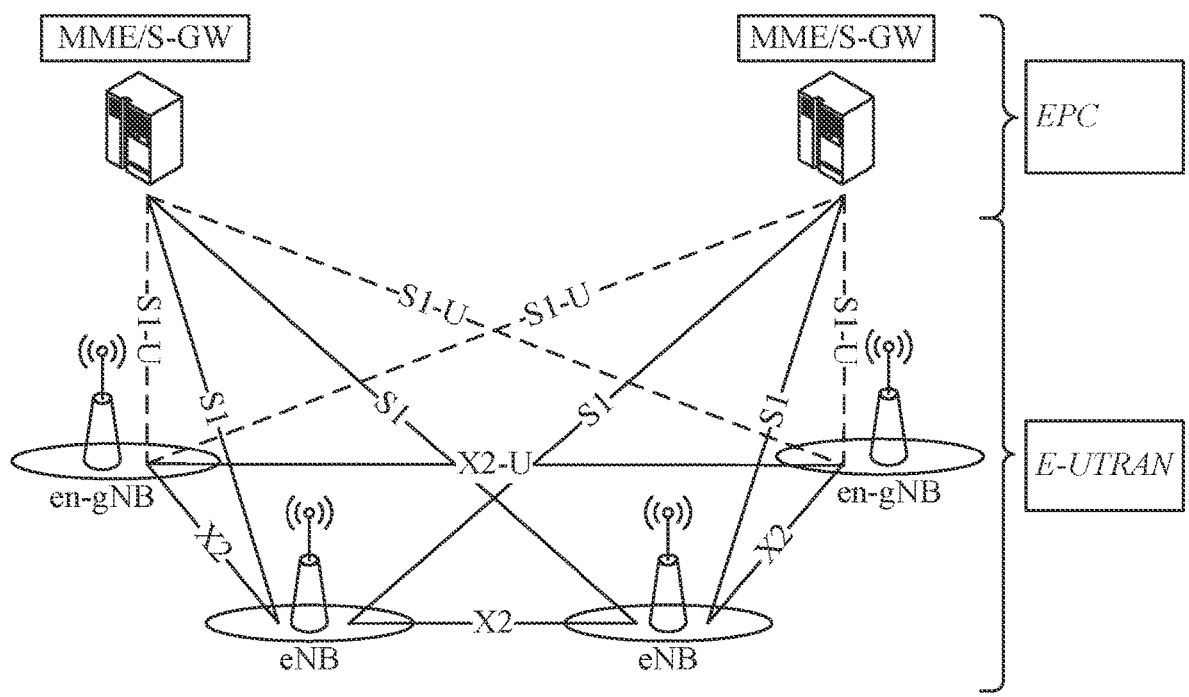
FIG. 2 is a schematic diagram of an EN-DC architecture in the related art.

In order to support the voice service and the MBB service of the mobile terminal at the same time, an EN-DC network architecture is provided. FIG. 2 is a schematic diagram of an EN-DC architecture in the related art, as shown in FIG. 2, one terminal is simultaneously connected to one eNB (4G base station, LTE base station) and the eNB serves as a master node (MN) and to one gNB (5G base station, NR base station) and the gNB serves as a secondary node (SN). The master node eNB is connected to the 4G core network EPC over an S1 interface and to the 5G base station over an X2 interface. This 5G base station gNB may also be connected to the EPC via an S1-User Plane (S1-U) interface, and may also be connected to other 5G base stations via an X2-User Plane (X2-U) interface.

In the access network, a network mode in which two base stations (such as, a 4G base station and a 5G base station in an EN-DC architecture) jointly provide communication services to a UE in a tightly coupled manner is referred to as a dual connectivity (DC) network. As shown in FIG. 2, the two base stations are divided into a master node (MN, also referred to as a first network element) and a secondary node (SN, also referred to as a second network element). Through the design of the dual-connection network, the communication capacity of one session can be improved.

In a scenario where the UE is handed over from the SA 5G network to the EN-DC network, the UE is originally connected to the SA 5G network, the UE is conducting the MBB service. At this time, the voice service (such as, answering a voice call or initiating a voice telephone call) is needed, but the 5G network cannot support the voice service, the UE needs to be handed over to the LTE network to establish a VoLTE service, the UE needs to continue the original MBB service, therefore the UE is handed over to the EN-DC network, a VoLTE connection is established at an LTE RAN node, and an original MBB service connection is established at the NG-RAN node.

In a scenario where the UE is handed over from the EN-DC network to the SA 5G network, the UE is originally connected to the EN-DC network, a source-master node (S-MN) which is an LTE eNB, and a source-secondary node (S-SN) which is the gNB and is also referred to as NG-RAN node, and when the UE ends the VoLTE service (such as, hanging up the telephone) and continues the 5G service (such as, broadband streaming service and MBB service), the UE is handed over to the SA 5G network (Stand-alone NR).

For the first scenario described above, when a secondary node (SN) in the EN-DC network after the UE is handed over and a SA 5G base station before the UE is handed over are a same base station, a method is provided so that radio resources of the UE on the same 5G base station may continue to be used without being released. A similar method is also provided for the second scenario described above. A target 5G base station after the UE is handed over can learn that the target 5G base station and the source 5G base station before the UE is handed over are a same 5G base station, and the UE can continue to use original radio resources.

However, no method is provided to enable the 5G base station before the UE is handed over to learn the point and reserve the radio resources of the UE. The source base station before the UE is handed over releases the radio resource of the UE after learning that the UE is successfully handed over, so that the target 5G base station after the UE is handed over cannot continue to use the radio resource of the UE.

An embodiment of the present application provides a network handover method and apparatus, a device and a storage medium, so that the target 5G base station after the UE is handed over can learn that the target 5G base station and the source 5G base station before the UE is handed over are the same 5G base station, and the UE can continue to use original radio resources.

Figure 3:
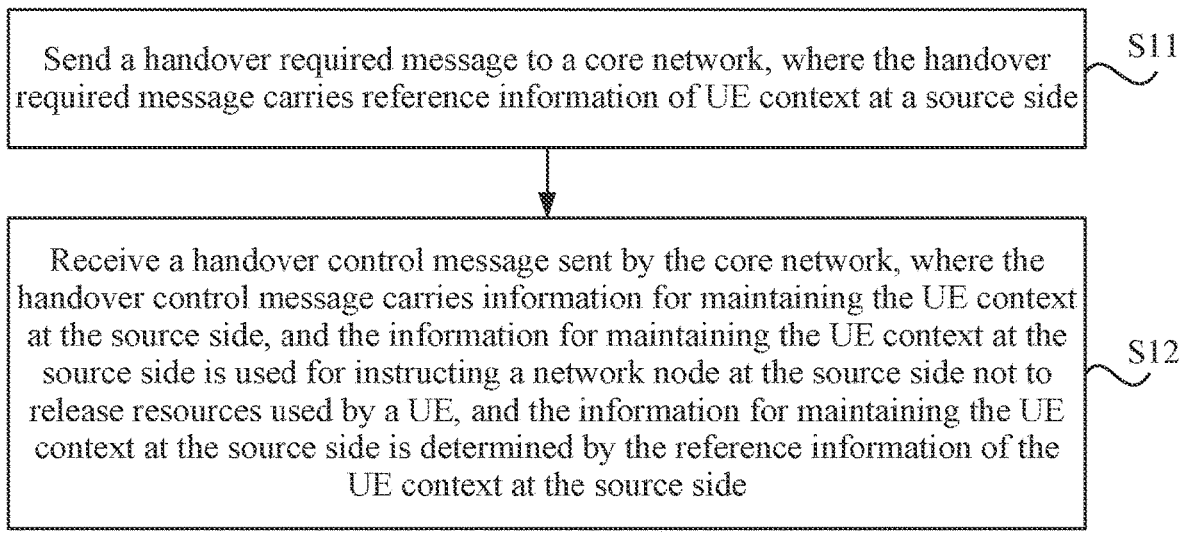
FIG. 3 is a flowchart of a network handover method provided in an embodiment of the present application.

In an embodiment, an embodiment of the present application provides a network handover method, and FIG. 3 is a flowchart of a network handover method provided in an embodiment of the present application. The method may be suitable for a case where a UE continues to use original radio resources before and after a network handover. The method may be performed by a network handover apparatus provided in the present application, the network handover apparatus may be implemented by software and/or hardware, and the method is applied to a first communication node.

As shown in FIG. 3, the network handover method provided in the embodiment of the present application mainly includes processes S11 and S12.

In S11, a handover required message is sent to a core network, where the handover required message carries reference information of UE context at a source side.

In S12, a handover control message sent by the core network is received, where the handover control message carries information for maintaining the UE context at the source side, and the information for maintaining the UE context at the source side is used for instructing a network node at the source side not to release resources used by a UE, and the information for maintaining the UE context at the source side is determined by the reference information of the UE context at the source side.

In this embodiment, the first communication node may be understood as a network node at the source side. If the network handover is a handover from an SA 5G network to an EN-DC network, the first communication node may be understood as an NG-RAN node in the SA 5G network. If the network handover is a handover from the EN-DC network to the SA 5G network, the first communication node may be understood as a secondary node in the EN-DC network, and the secondary node in the EN-DC network is also a 5G base station.

In an exemplary implementation, in a case where the network handover is from the SA 5G network to the EN-DC network, before the handover control message sent by the core network is received, the method further includes: a secondary node addition request message sent by a second communication node is received, where the secondary node addition request message carries the reference information of the UE context at the source side; and a secondary node addition acknowledge message is sent to the second communication node, where the secondary node addition acknowledge message is used for acknowledging a target node that the UE establishes a dual connectivity under the EN-DC network.

In an exemplary implementation, the reference information of the UE context at the source side includes a source next generation radio access network node (Source NG-RAN node) and/or a radio access network user equipment next generation interface application protocol identifier (RAN UE NGAP ID).

In an exemplary implementation, the reference information of the UE context at the source side carried in the secondary node addition request message is sent by the core network to the second communication node.

In an exemplary implementation, in a case where the network handover is a handover from the SA 5G network to the EN-DC network, the first communication node is a 5G base station in the SA 5G network, and the second communication node is an LTE eNB in the EN-DC network.

In an exemplary implementation, in a case where the network handover is a handover from the EN-DC network to the SA 5G network, after the handover control message sent by the core network is received, the method further includes: a secondary node addition request message is sent to a second communication node, where the secondary node addition request message carries the reference information of the UE context at the source side; and a secondary node addition acknowledge message sent by the second communication node is received, where the secondary node addition acknowledge message is used for acknowledging that the UE establishes a dual connectivity under the EN-DC network.

In an exemplary implementation, in a case where it is determined that the resources used by the UE is reserved, a third message is sent to a third communication node, where the third message carries radio resource indication information.

In an exemplary implementation, in a case where the network handover is a handover from the SA 5G network to the EN-DC network, a UE release complete message is sent to the core network; and the method further includes: a UE release message is sent to the second communication node, where the UE release message is used for instructing the second communication node to release a signaling connection between the second communication node and the first communication node.

In an example embodiment, the reference information of the UE context at the source side includes a secondary node user equipment X2 interface application protocol identifier (SN UE X2AP ID) information element.

In an exemplary implementation, in a case where the network handover is a handover from the EN-DC network to the SA 5G network, the first communication node is an LTE eNB in the EN-DC network, and the secondary node is a 5G base station in the SA 5G network.

Figure 4:
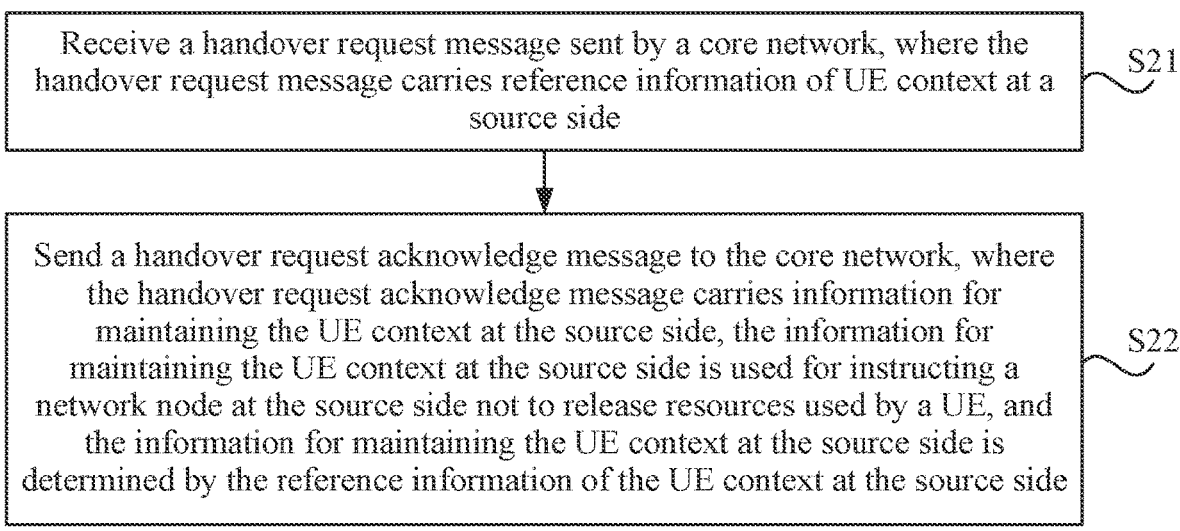
FIG. 4 is a flowchart of a network handover method provided in an embodiment of the present application.

In an embodiment, an embodiment of the present application provides a network handover method, and FIG. 4 is a flowchart of a network handover method provided in an embodiment of the present application. The method may be suitable for a case that a UE continues to use original radio resources before and after a network handover. The method may be performed by a network handover apparatus provided in the present application, the network handover apparatus may be implemented by software and/or hardware, and the method is applied to a second communication node.

As shown in FIG. 4, the network handover method provided in the embodiment of the present application mainly includes processes S21 and S22.

In S21, a handover request message sent by a core network is received, where the handover request message carries reference information of UE context at a source side.

In S22, a handover request acknowledge message is sent to the core network, where the handover request acknowledge message carries information for maintaining the UE context at the source side, the information for maintaining the UE context at the source side is used for instructing a network node at the source side not to release resources used by a UE, and the information for maintaining the UE context at the source side is determined by the reference information of the UE context at the source side.

In this embodiment, in a case where the network handover is a handover from an EN-DC network to an SA 5G network, a first communication node is an LTE eNB in the EN-DC network and a secondary node is a 5G base station in the SA 5G network. In a case where the network handover is a handover from an SA 5G network to an EN-DC network, the first communication node is a 5G base station in the SA 5G network, and the second communication node is an LTE eNB in the EN-DC network.

In an exemplary implementation, in a case where a network handover is a handover from an SA 5G network to an EN-DC network, after the handover request message sent by the core network is received, the method further includes: a secondary node addition request message is sent to a first communication node, where the secondary node addition request message carries the reference information of the UE context at the source side; and a secondary node addition acknowledge message sent by the first communication node is received, where the secondary node addition acknowledge message is used for acknowledging a target node that the UE establishes a dual connectivity under the EN-DC network.

In an exemplary implementation, in a case where the network handover is a handover from the EN-DC network to the SA 5G network, the method further includes: the secondary node addition request message sent by the first communication node is received, where the secondary node addition request message carries the reference information of the UE context at the source side; and the secondary node addition acknowledge message is sent to the first communication node, where the secondary node addition acknowledge message is used for acknowledging that the UE establishes the dual connectivity under the EN-DC network.

In an exemplary implementation, in a case where the network handover is a handover from an SA 5G network to an EN-DC network, the method further includes: a UE release message sent by a first communication node is received, where the UE release message is used for instructing the second communication node to release a signaling connection between the second communication node and the first communication node.

Figure 5:
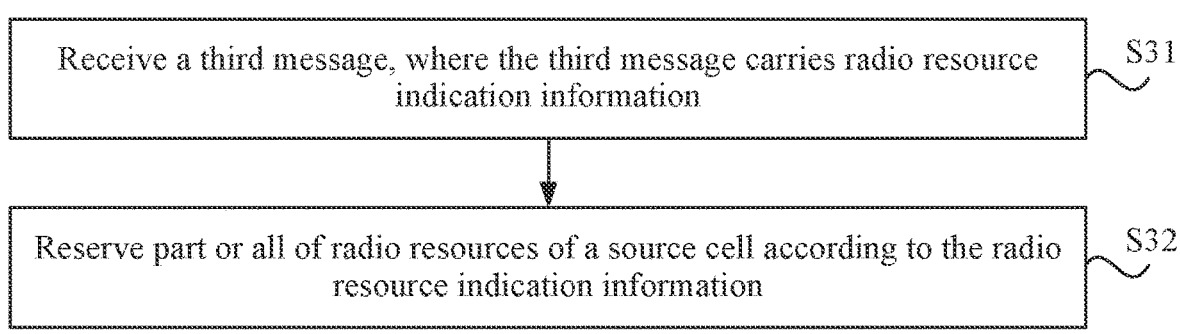
FIG. 5 is a flowchart of a network handover method provided in an embodiment of the present application.

In an embodiment, an embodiment of the present application provides a network handover method, and FIG. 5 is a flowchart of a network handover method provided in an embodiment of the present application. The method may be suitable for a case that a UE continues to use original radio resources before and after a network handover. The method may be performed by a network handover apparatus provided in the present application, the network handover apparatus may be implemented by software and/or hardware, and the method is applied to a third communication node.

As shown in FIG. 5, the network handover method provided in the embodiment of the present application mainly includes processes S31 and S32.

In S31, a third message is received, where the third message carries radio resource indication information.

In S32, part or all of radio resources of a source cell is reserved according to the radio resource indication information.

In an exemplary implementation, the third message is sent by a first communication node.

In an exemplary implementation, the third message is a radio resource control (RRC) reconfiguration message, or the third message is a radio control message.

In an exemplary implementation, the radio resource indication information includes source cell reservation indication information, or secondary cell information, or reservation protocol data unit (PDU) session information, or a non-access stratum (NAS) resource reservation indication, or a suspend indication, or quality of service (QoS) flow reservation information.

In an exemplary implementation, the QoS flow reservation information is used for indicating that a QoS flow or QoS flow information is reserved after a network handover.

In an exemplary implementation, the source cell reservation indication information is used for indicating that the part or all of radio resources of the source cell are reserved after a network handover.

In an exemplary implementation, the part or all of radio resources of the source cell are reserved based on a relationship of the secondary cell information and source cell information after a network handover.

In an exemplary implementation, the secondary cell information is information of a single secondary cell or a list of secondary cells.

In an exemplary implementation, the NAS resource reservation indication is used for indicating that part or all of NAS resources of the source cell are reserved after a network handover, where the part or all of NAS resources include one or more of: a registration status of a UE, tracking area updating (TAU) information, or integrity and ciphering information.

In an exemplary implementation, the suspend indication is used for indicating that the part or all of radio resources of the source cell are reserved after a network handover.

In an exemplary implementation, the part or all of radio resources include part or all of radio connections, where the radio connection includes at least one of: an RRC connection, a signaling radio bearer (SRB), a data radio bearer (DRB), a PDU session context, or an NAS layer connection.

In an exemplary implementation, the part or all of radio resources include part or all of radio configurations, where the radio configuration includes at least one of: a layer 1 (L1) (physical layer) configuration, a media access control (MAC) layer configuration, a radio link control (RLC) layer configuration, an RRC layer configuration, a packet data convergence protocol (PDCP) layer configuration, or an NAS layer configuration.

In an exemplary implementation, the reservation PDU session information is used for indicating that a PDU session is reserved after a network handover.

In an exemplary implementation, the reservation PDU session information includes PDU session reservation indication information or an information list of PDU sessions to be reserved; where the information list of the PDU sessions includes information of one or more PDU sessions.

In an exemplary implementation, that the part or all of radio resources are reserved includes: a downlink bandwidth part (BWP) is continued to be used; and downlink data sent by a physical downlink shared channel (PDSCH) is received according to resource indication value (RIV) indication information in downlink control information (DCI).

In an exemplary implementation, if $(L_{CRBs}-1) \leq \lfloor N_{RB}^{DL}/2 \rfloor$ is satisfied, $RIV = N_{RB}^{DL}(L_{CRBs}-1) + RB_{start}$; and if $(L_{CRBs}-1) \leq \lfloor N_{RB}^{DL}/2 \rfloor$ is not satisfied, $RIV = N_{RB}^{DL}(N_{RB}^{DL}-L_{CRBs}+1) + (N_{RB}^{DL}-1-RB_{start})$, where $L_{CRBs}$ is a length of consecutive RBs, $N_{RB}^{DL}$ is a number of RBs of a downlink bandwidth, and start $RB_{start}$ starting resource block in the downlink bandwidth.

In an exemplary implementation, that the part or all of radio resources are reserved includes: a cell-radio network temporary identifier (C-RNTI) of a UE is reserved, where the C-RNTI of the UE is used for receiving DCI information.

In an exemplary implementation, that the part or all of radio resources are reserved includes: a resource allocation manner of a physical uplink control channel (PUCCH) is reserved; and/or an allocated PUCCH resource set is reserved.

In an exemplary implementation, that the part or all of radio resources are reserved includes: one or more data radio bearers (DRBs) are reserved; one or more signaling radio bearers (SRBs) are reserved; and one of an SRB1 or an SRB2 is modified to an SRB3.

In an exemplary implementation, that the part or all of radio resources are reserved includes: an original PDU session is continued to be used for a data transmission; or after the PDU session is initiated by a first communication node, and a data connection is reestablished and recovered.

In an exemplary implementation, that reserving the part or all of radio resources are reserved includes: a security context is used before a network handover.

In an exemplary implementation, that the part or all of radio resources are reserved includes: a dedicated control channel (DCCH) is reserved.

In an exemplary implementation, that the DCCH is reserved includes: data is continued to be sent and received according to the DCCH.

In an exemplary implementation, that the part or all of radio resources are reserved includes: part of QOS flows or part of QOS flow information is reserved, or all of QOS flows or QOS all of flow information is reserved.

In an exemplary implementation, that the QOS flows or the QOS flow information is reserved includes: the QOS flow and/or the QOS flow information is continued to be used for performing a data sending and/or receiving on a user plane.

In an application implementation, this embodiment provides a network handover method for overcoming the deficiencies of the first scenario (UE is handed over from the SA 5G network to the EN-DC network).

The UE is originally connected to the SA 5G network, the UE is performing an MBB service, and at this time, a voice service (such as, answering a voice call or initiating a voice telephone call) needs to be performed, but the SA 5G network cannot support the voice service, the UE needs to be handed over to an LTE network to establish a VoLTE service (a Voice based on the LTE), and the UE needs to continue the original MBB service. Therefore, the UE is handed over to the EN-DC network, a VoLTE connection is established at an LTE RAN base station, and an original MBB service connection is established at the NG-RAN base station.

Figure 6:
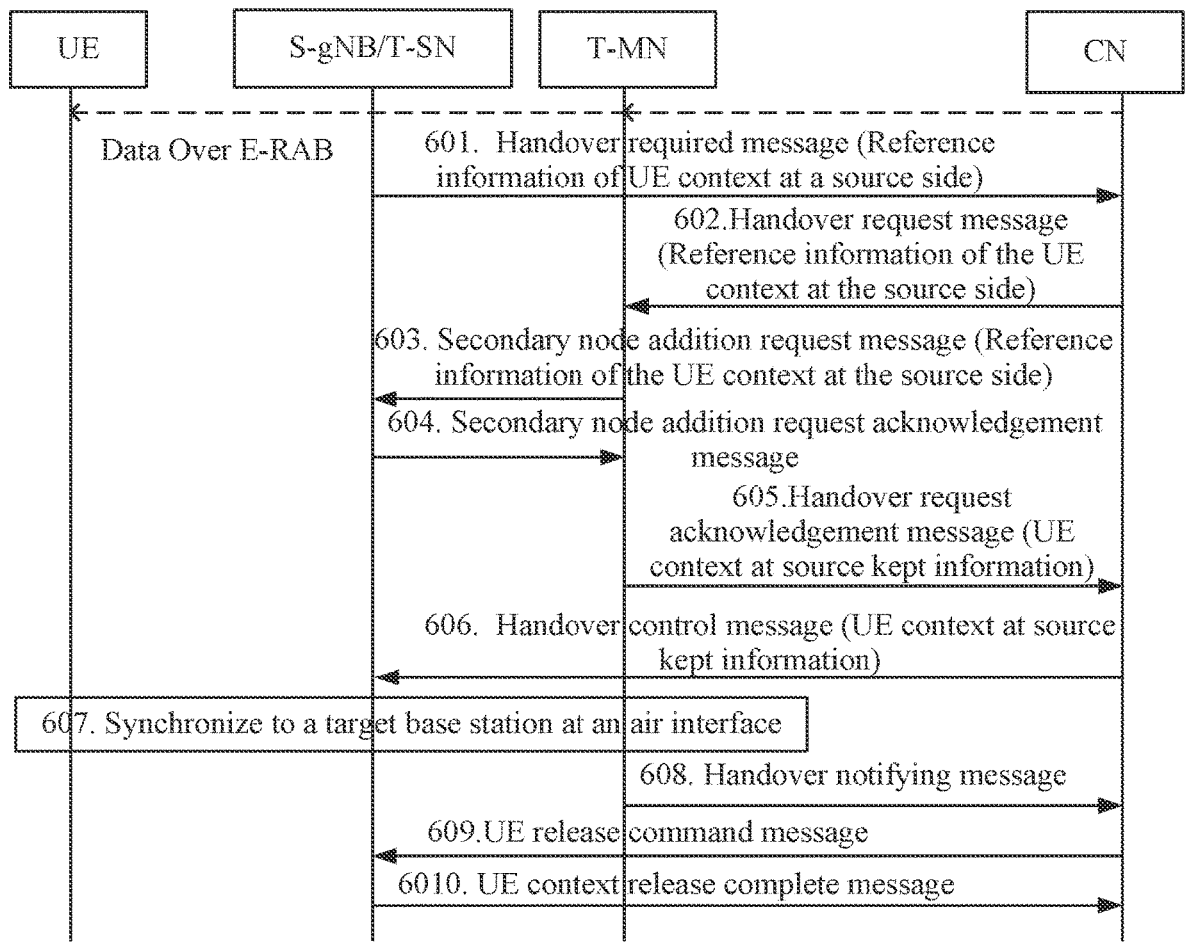
FIG. 6 is a flowchart of a handover of a UE from a stand-alone (SA) 5G network to an EN-DC network provided in an embodiment of the present application.

FIG. 6 is a flowchart of a handover of a UE from an SA 5G network to an EN-DC network provided in an embodiment of the present application, as shown in FIG. 6, the UE is connected to a 5G base station (S-gNB), also referred to as a source node (S-node), of a source SA 5G network, and in a target EN-DC network to which the UE is handed over, a target master node (T-MN) is an LTE eNB, also referred to as Master eNB (MeNB), and a target secondary node (T-SN) is a 5G base station, that is, an NG-RAN node. When a target NG-RAN node is an original NR node, the following procedure is performed.

In 601, the source node S-node (S-gNB in FIG. 2) sends a handover required message to a core network (CN). The handover required message includes reference information of UE context at a source side (UE context reference at Source), and the information is contained in a source to target transparent container of an existing information element (IE) of the message.

The UE context reference at Source uniquely identifies a UE association over an NG interface and the source node (NG-RAN node). In a first scenario, because the source node is a gNB, and the gNB is connected to a 5GC, the UE context reference at Source may be commonly identified with a combination of a Source NG-RAN node (globally unique identifier) and an RAN UE NGAP ID. That is, the UE context reference at Source includes any one or a combination of the Source NG-RAN node or the RAN UE NGAP ID.

In 602, the T-MN (target node, Target Master NG-RAN Node) receives a handover request message from the core network, where the handover request message includes UE context reference at Source information contained in an information element Source To Target transparent Container of the message.

The UE context reference at Source information is carried in a Source To Target transport Container, and the CN directly sends the UE context reference at Source information to the T-MN after receiving the UE context reference at Source information from the S-node.

In 603, the T-MN sends a secondary node addition request (SN addition request) message to the T-SN. When the T-MN determines that the T-SN and the S-node are the same node and decides to continue to use a radio resource of the UE on the S-node, the secondary nod addition request message includes UE context reference at Source information or RAN UE NGAP ID information. According to this information, the T-SN finds the UE context of the UE at the source node and continues to use a resource of the UE at the source side.

In 604, the T-SN sends a secondary node addition request acknowledgement (SN addition request acknowledgement) message to the T-MN, so as to notify the T-MN that the UE has established a dual connectivity under the EN-DC network.

In 605, the T-MN sends a handover request acknowledgement message to the core network. When the T-MN learns through the processes 603 and 604 that the UE successfully established the T-SN and that the T-SN continues to use a UE resource on the S-node, the handover request acknowledgement message includes UE context kept at the source side (UE context at source kept) information, and this information is included in a Target to Source transparent container.

The UE context at Source kept information refers to that a UE resource of the UE at the source node is continuously used at the target node after handover, and the target node uses the information to notify the source node not to delete the resource of the UE at the source node.

In 606, the S-node receives a handover control (Handover command) message from the core network, where the handover control message includes UE context at source kept information contained in the Target to Source transparent container.

The UE context at source kept information is carried in the Target to Source transport container, and the CN directly sends the UE context at source kept information to the S-node after receiving the UE context at source kept information from the T-MN.

In 607, the UE synchronizes to a target base station at an air interface, namely, the UE establishes a dual connection with the T-MN and the T-SN, the UE establishes a VoLTE service on the T-MN, and the MBB service continues to be completed at the T-SN.

In 608, the T-MN sends a handover notifying message to the core network, the handover notifying message is used for notifying the core network that the UE has been handed over to the target base station.

In 609, the S-node receives a UE release control message (UE release command message) from the core network. The S-node releases a signaling connection between the S-node and the CN (i.e., releases the NG interface), but does not release the resources of the UE. This is because the S-node includes indication information of UE context at source kept in the message received in step 606, and then learns that the radio resource of the UE at the source 5G base station is continuously used by the target base station.

In 6010, the S-node sends a UE context release complete message to the core network.

In the above-described applicable embodiments, from the perspective of the source node (S-node), the source node mainly performs the following operations: the S-node hands over the UE to the target node through the core network, and the S-node sends and receives the following messages to and from the core network.

In process 1, the handover required message is sent, where the message includes UE context reference at Source information; and the information uniquely identifies a UE resource of the UE at the source node.

In process 2, a handover control message (handover command message) is received, where the message includes UE context at source kept information. The information notifies the source node not to release the UE resource of the UE at the source node.

In process 3, a UE release command message is received, and the source node releases a connection between the source node and the core network, but does not release the UE resource of the UE at the source node.

In process 4, a UE release complete message is sent to notify the core network that the connection between the source node and the core network has been released.

In the above-described applicable embodiments, the target node mainly performs the following operations from the viewpoint of the target node (T-MN).

The target master node (T-MN) sends and receives the following messages to and from the core network, and sends and receives the following messages to and from the target secondary node.

In process 1, a handover request message from the core network is received, where the message includes UE context Reference at Source information.

In process 2/3, according to the UE context Reference at Source information, the T-SN selected by the T-MN is the S-node, and an EN-DC dual connection is established for the UE through the step 2/3.

In process 4, a handover request acknowledgement message is sent to the core network, and the message includes UE context at source kept information, and the UE context at source kept information indicates that UE resource of the UE at the source node need to be reserved and are continuously used by the target secondary nod.

In process 5, after the UE is synchronized to the target node, a handover notifying message is sent to the core network to notify the core network that the UE has been handed over to the target node.

In one applicable implementation, this embodiment provides a network handover method for overcoming the deficiencies of the second scenario (UE is handed over from the EN-DC network to the SA 5G network).

The UE is originally connected to the EN-DC network, for example, the UE performs an MBB service while making a call. A source-master node (S-MN) is an LTE eNB, and the S-SN (source-secondary node) is a gNB, also referred to as NG-RAN node. When the UE ends a VoLTE service (e.g., hang up) and continues 5G service (such as, broadband streaming service, MBB service), the UE is handed over from the EN-DC network to the SA 5G network (Stand-alone NR).

Figure 7:
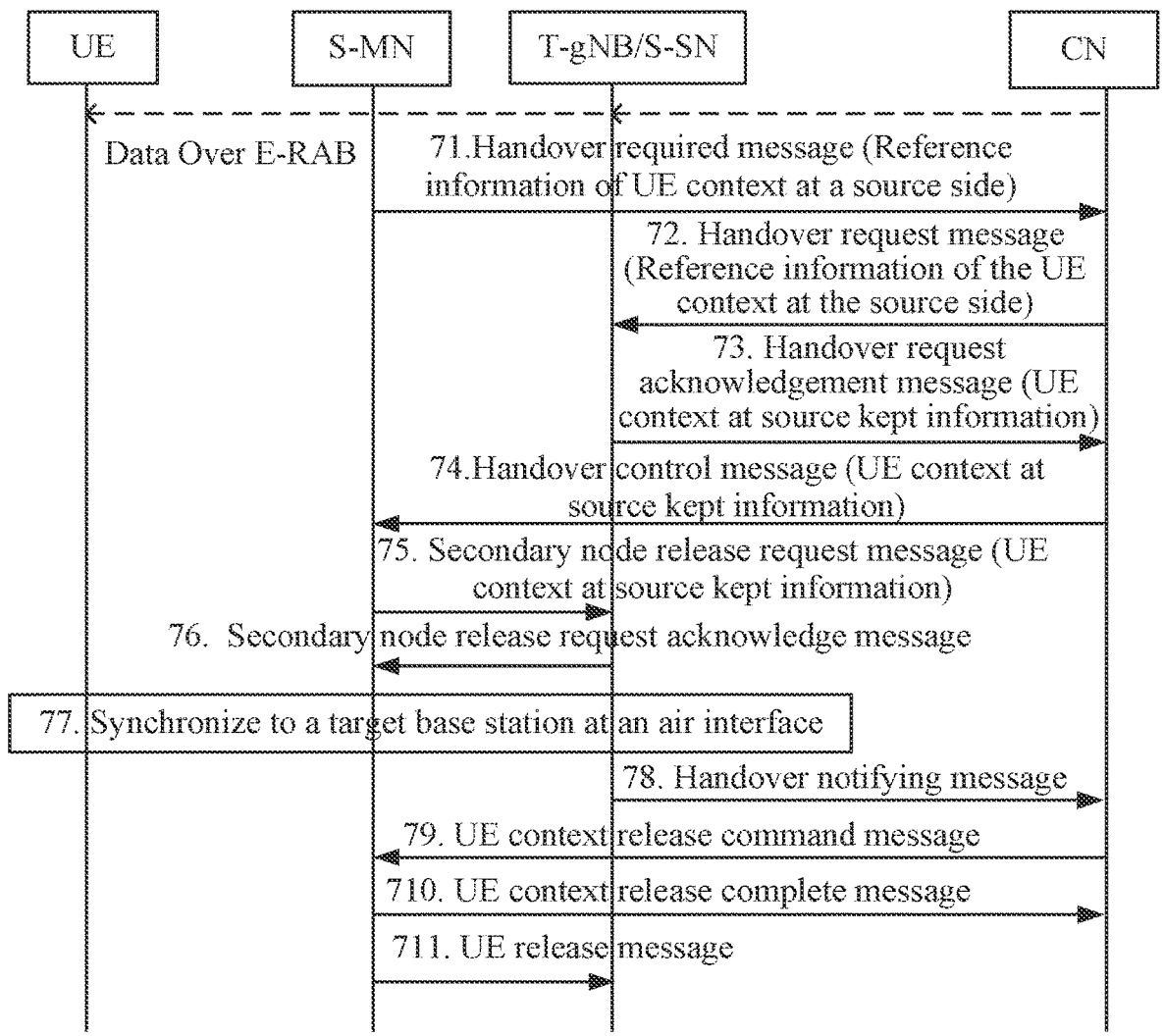
FIG. 7 is a flowchart of a handover of a UE from an EN-DC network to an SA 5G network provided in an embodiment of the present application.

FIG. 7 is a flowchart of a handover of a UE from an EN-DC network to an SA 5G network provided in the present application, as shown in FIG. 7, when an S-SN node and a T-MN node are the same NG-RAN node, the following process is performed.

In process 71, a source-master node (S-MN, such as an MeNB node) sends a handover required message to a core network (CN), where the message includes a context reference information element (IE) at a source side (UE context reference at Source), and the information element is included in a Source To Target Transparent Container.

In the second scenario, since a source-secondary node refers to an S-SN in the EN-DC network, and this S-SN is connected to the S-MN, the UE context reference at Source may be identified with an SN UE X2AP ID information element.

In process 72, a T-node (target node, Target NG-RAN node) receives a handover request message from the core network, where the handover request message includes UE context reference at Source information, and this information is contained in the Source To Target Transparent Container.

In process 73. the T-node sends a Handover request acknowledgement message, where the message includes information for maintaining the UE context at the source side (UE context at source kept information). When the T-node determines that the T-node is the same NG-RAN node as the S-SN and decides to continue to use a UE resource on the S-SN, the message includes the indication information, and the information is contained in a Target to Source transparent container.

In process 74, the S-MN receives a handover control message (handover command message) sent by the core network, where the message includes UE context at source kept information.

In process 75, the S-MN sends a secondary node release request (SN release request) message to the S-SN, where the message includes UE context at source kept information.

In process 76, the S-SN sends a secondary node release request acknowledge (SN release request acknowledge) message to the S-MN.

In process 77, the UE synchronizes to a target base station at an air interface, that is, the UE establishes a connection with the T-node, and the UE continues to perform an MBB service at an SA 5G base station.

In process 78, the T-node sends a handover notifying message to the core network, so as to notify the core network that the UE has been handed over to the target base station (T-node).

In process 79, the S-MN receives a UE release command message from the core network. The S-MN releases a connection between the S-MN and the CN (i.e., releases an S1 interface).

In process 710, the S-MN sends a UE release complete message to the core network.

In process 711, the S-MN sends a UE release message to the S-SN. The S-SN releases a signaling connection with the M-SN after receiving the message, but keeps a resource of the UE on the S-SN so that the T-MN can continue to use the resource of the UE on the S-SN.

In the above-described applicable embodiments, the source node (S-MN) mainly performs the following operations from the viewpoint of the source node.

The source-master node sends and receives the following messages to and from the core network, and sends and receives the following messages to and from the source-secondary node.

In process 1, a Handover required message is sent to the core network, where the message includes UE context reference at Source information, and the information uniquely identifies a UE resource of the UE at the source-secondary node.

In process 2, a handover command message is received from the core network, where the message includes UE context at source kept information. The information notifies the source-secondary node (S-SN) not to release the UE resource of the UE at the source-secondary node.

In process 3, an SN release request message is sent to the S-SN, where the message includes UE context at source kept information, and the source-secondary node (S-SN) is notified not to release the UE resource of the UE at the source-secondary node.

In process 4, an SN release request acknowledge message from the S-SN is received, and the S-SN releases an X2 connection with the source-master node is learnt.

In the above-described applicable embodiments, the target node mainly performs the following operations from the viewpoint of the target node (T-node).

The T-node sends and receives the following messages to and from the core network through the core network.

In process 1, a handover request message is received, where the message includes UE context reference at Source information.

In process 2, a handover request acknowledge message is sent, where the message includes UE context at source kept information when the T-node determines that the T-node and the S-SN are the same NG-RAN node and decides to continue to use the UE resource on the S-SN.

In process 3, the UE synchronizes to the target base station over the air interface, that is, the UE establishes a connection with the T-node, and the UE continues to perform an MBB service at the SA 5G base station.

In process 4, the T-node sends a handover notifying message to the core network to notify the core network that the UE is handed over to the target base station (T-node).

Figure 8:
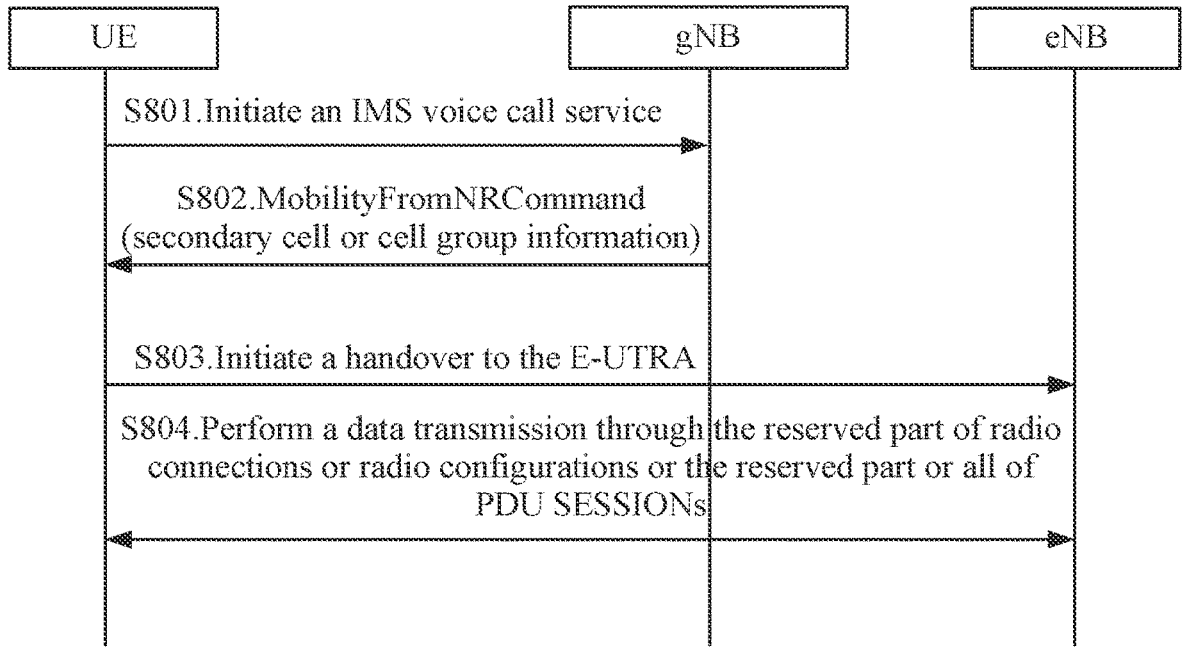
FIG. 8 is a flowchart of a method for a handover between 4G and 5G and between 5G SA mode and 5G non-stand-alone (NSA) mode when a terminal initiates a voice call provided in an embodiment of the present application.

In an application implementation, FIG. 8 is a flowchart of a method for a handover between 4G and 5G and between 5G SA mode and 5G NSA mode when a terminal initiates a voice call provided in an embodiment of the present application.

This embodiment is an operation between a terminal and the target RAN node and an RAN node of a source network in the above-described embodiments; this embodiment relates to three network nodes, where a network node 1 is a UE; a network node 2 is a network node NR gNB where the UE currently resides; and a network node 3 is an evolved-universal terrestrial radio access (E-UTRA) eNB of a target network RAN network node for a UE handover.

In S801, the UE in an RRC connected state actively initiates an Internet protocol Multimedia Subsystem (IMS) voice call service to a RAN node gNB of a source network to which the UE belongs.

In S802, after the CN finds that a current 5G System (5GS) does not support an IMS voice service, the gNB sends a MobilityFromNRCommand message from the NR to notify the UE to handover to an EN-DC network; and the MobilityFromNRCommand message includes secondary cell or cell group information (NR).

In S803, the terminal initiates a handover to the E-UTRA according to the MobilityFromNRCommand. If the terminal finds that the secondary cell or cell group information is consistent with cell or cell group information of a source network node gNB, after a cell network node (eNB) handover to the E-UTRA is completed, part or all of radio connections with the source network node gNB, or part or all of radio configurations with the source network node gNB, or part or all of PDU sessions with the source network node gNB are reserved.

In S804, the EN-DC network performs a data transmission through the reserved part of radio connections or radio configurations or the reserved part or all of PDU SESSIONs.

After the UE receives the MobilityFromNRCommand message carrying 0 to more secondary cells or cell group information, if one cell or cell group information is consistent with cell information or cell group information of the source cell, or they use the same network node gNB, then the UE does not initiate a network node gNB radio configuration or radio connection establishment request with the secondary cell or cell group.

After the UE receives the MobilityFromNRCommand message, if one cell or cell group information in the 0 to more secondary cells or cell group information is consistent with cell information or cell group information of the source cell, or they use the same network node gNB, then the UE reserves part or all of radio configurations or part or all of radio connections with the S-MN network node gNB of the source cell.

After the UE receives the MobilityFromNRCommand message carrying master cell or cell group information, if one cell or cell group information is consistent with cell information or cell group information of the source cell, or they use the same network node gNB, then the UE reserves part or all of radio resources with the S-MN network node gNB of the source cell.

The part or all of connections include an RRC connection; part or all of SRBs; or part or all of DRBs.

Part or all of radio resources include: a L1 (physical layer) resource, an MAC resource, an SRB, a DRB, a PDCP entity, a service data adaptation protocol (SDAP) entity.

The radio configuration includes part or all of L1 (physical layer) configurations, part or all of MAC layer configurations, part or all of RLC layer configurations, part or all of RRC layer configurations, part or all of PDCP layer configurations, and part or all of NAS configurations.

The shown step S801 of initiating a voice call service includes the following processes.

The terminal sends an invite message to an IMS server via the gNB, the IMS server sends a 100 trying message to the UE via the gNB, the UE sends a 183 session progress to the IMS server via the gNB, the IMS server sends a provisional acknowledge (PRACK) message to the UE, and the UE sends a 200 OK message to the IMS server.

The reserved part or all of physical layer configurations includes that: the UE continues to use the downlink BWP and receives downlink data sent by the PDSCH according to the RIV indication information in the DCI.

RIV values are as follows: if $(L_{CRBs}-1) \leq \lfloor N_{RB}^{DL}/2 \rfloor$ is satisfied, then $RIV=N_{RB}^{DL}(L_{CRBs}-1)+RB_{start}$ holds true; if $(L_{CRBs}-1) \leq \lfloor N_{RB}^{DL}/2 \rfloor$ is not satisfied, then $RIV=N_{RB}^{DL}(N_{RB}^{DL}-L_{CRBs}+1)+(N_{RB}^{DL}-1-RB_{start})$, holds true; where $L_{CRBs}$ is a length of consecutive RBs, $N_{RB}^{DL}$ is a number of RBs of a downlink bandwidth, and $RB_{start}$ is a starting resource block in the downlink bandwidth.

That the part or all of physical layer configurations are reserved includes: a C-RNTI of a UE is reserved, where the C-RNTI of the UE is used for receiving DCI information.

That the part or all of physical layer configurations are reserved includes: a resource allocation manner of a physical uplink control channel (PUCCH) is reserved; and/or an allocated PUCCH resource set is reserved.

That the part or all of radio connections are reserved includes: one or more data radio bearers (DRBs) are reserved.

That the part or all of radio connections are reserved includes: one or more signaling radio bearers (SRBs) are reserved.

That the part or all of radio connections are reserved includes: one of an SRB1 or an SRB2 is modified to an SRB3.

That the part or all of NAS configurations are reserved includes: a registration status of a UE, and/or TAU information, and/or integrity and ciphering information are reserved.

After the UE finishes a handover, the original PDU SESSION is continued to be used for performing a data transmission, or the reestablishment of a PDN connection is initiated at the E-sgNB, and the data connection is recovered.

After the UE finishes a handover, the original PDU SESSION is continued to be used for performing a data transmission, or the reestablishment of a PDU SESSION is initiated at the E-sgNB, and the data connection is recovered.

Figure 9:
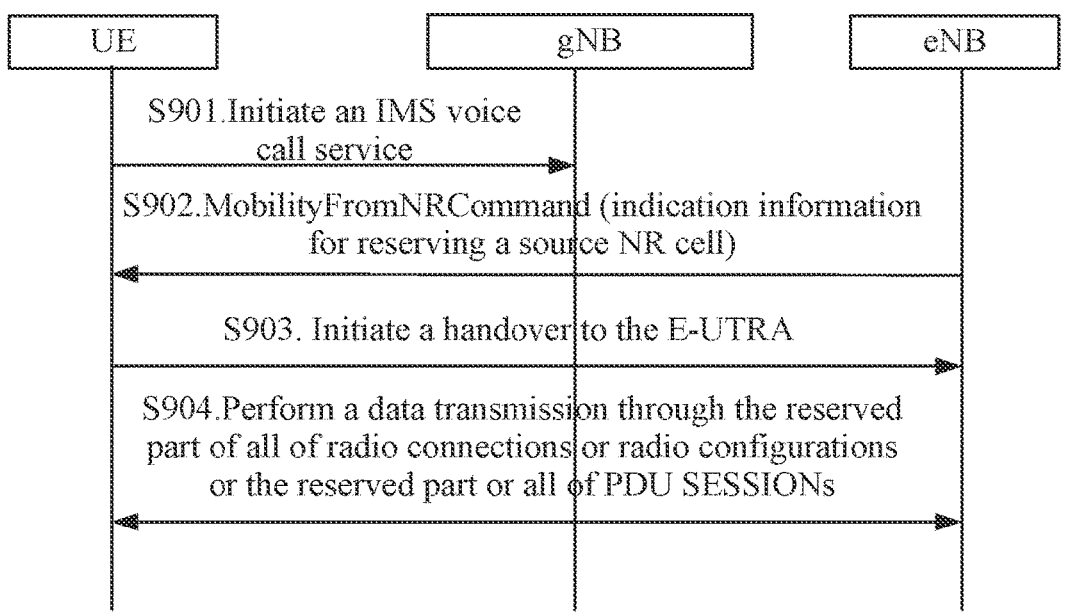
FIG. 9 is a flowchart of a method for a handover between 4G and 5G and between 5G SA mode and 5G NSA mode when a terminal initiates a voice call provided in an embodiment of the present application.

In an applicable implementation, FIG. 9 is a flowchart of a method for a handover between 4G and 5G and between 5G SA mode and 5G NSA mode when a terminal initiates a voice call provided in an embodiment of the present application. This embodiment involves three network nodes, a network node 1 is a UE; a network node 2 is an NR g-NB of a network in which the UE currently resides; and a network node 3 is an E-UTRA eNB of a target network to which the UE is handed over.

In S901, the UE handling an RRC connected state actively initiates an IMS voice call service to the gNB.

In S902, after the CN finds that a current 5GS does not support an IMS voice service, the eNB sends a MobilityFromNRCommand message to notify the UE to handover to an EN-DC network; and the MobilityFromNRCommand message includes indication information for reserving a source NR cell.

In S903, the terminal initiates a handover to the E-UTRA according to the MobilityFromNRCommand; and part or all of radio connections or radio configurations of the source NR cell are reserved, or part or all of PDU SESSIONs are reserved after a cell handover to the E-UTRA is completed.

The part or all of connections include an RRC connection and a related SRB, DRB.

The part or all of radio resources include a L1 (physical layer) resource, an MAC resource, an SRB, a DRB, a PDCP entity and an SDAP entity.

The radio configuration includes part or all of L1 (physical layer) configurations, part or all of MAC layer configurations, part or all of RLC layer configurations, and part or all of RRC layer configurations, part or all of PDCP layer configurations, and part or all of NAS configurations.

In S904, the EN-DC network performs a data transmission through part or all of reserved radio connections or radio configurations or PDU SESSIONs.

Figure 10:
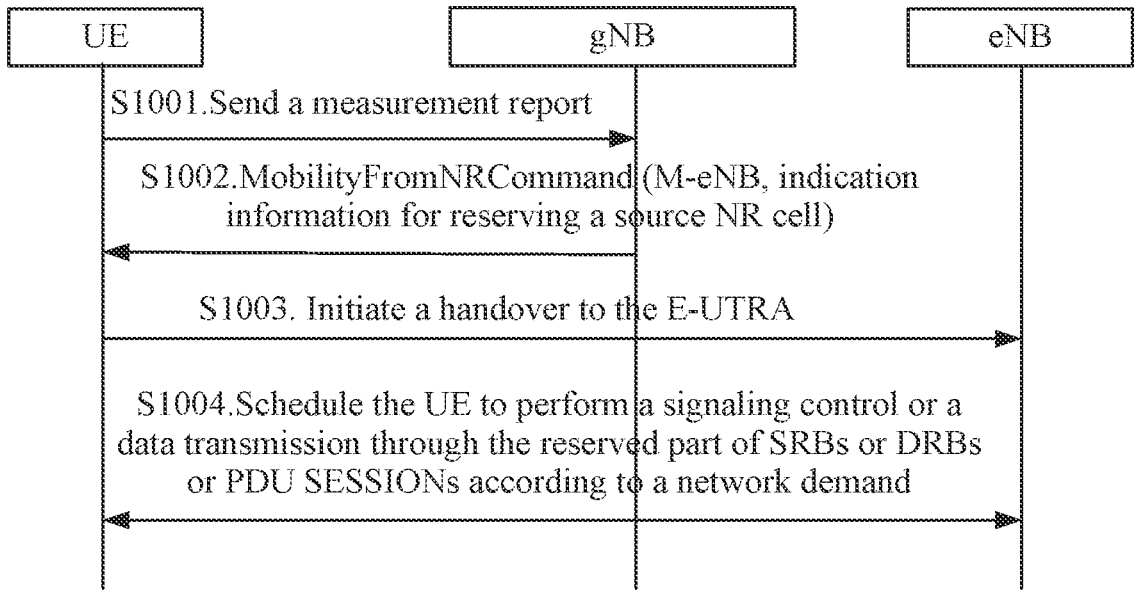
FIG. 10 is a flowchart of a method for a handover between 4G and 5G and between 5G SA mode and 5G NSA mode when a terminal initiates a voice call provided in an embodiment of the present application.

In an applicable implementation, FIG. 10 is a flowchart of a method for a terminal to handover between 4G and 5G and between 5G SA mode and 5G NSA mode provided in an embodiment of the present application. This embodiment involves three network nodes, a network node 1 is a UE; a network node 2 is a network NR gNB where the UE currently resides; and a network node 3 is an E-UTRA eNB of a target network to which the UE is handed over.

In S1001, the UE in an RRC connected state sends a measurement report to the gNB.

In S1002, the gNB sends a MobilityFromNRCommand message to notify the UE to handover to an EN-DC network; the MobilityFromNRCommand message includes T-MN information (M-eNB) of an E-UTRA and indication information for reserving a source NR cell.

In S1003, the terminal initiates a handover to the E-UTRA according to the MobilityFromNRCommand; and part or all of radio bearers of the source NR cell are reserved after a cell handover to the E-UTRA is completed.

That the part or all of radio bearers of the source cell are reserved includes: part or all of original physical layer resource configurations are reserved, and part or all of SDAP entities or PDCP entities in SRB1, SRB2 and DRB are reserved; all or part of PDU SESSIONs in an NR network are reserved; for all or part of PDU SESSIONs, a connection reestablishment of a corresponding PDN CONNECTION is initiated in the EN-DC network.

In S1004, the eNB schedules the UE to perform a signaling control or a data transmission through the reserved part of SRBs or DRBs or PDU SESSIONs according to a network demand.

Figure 11:
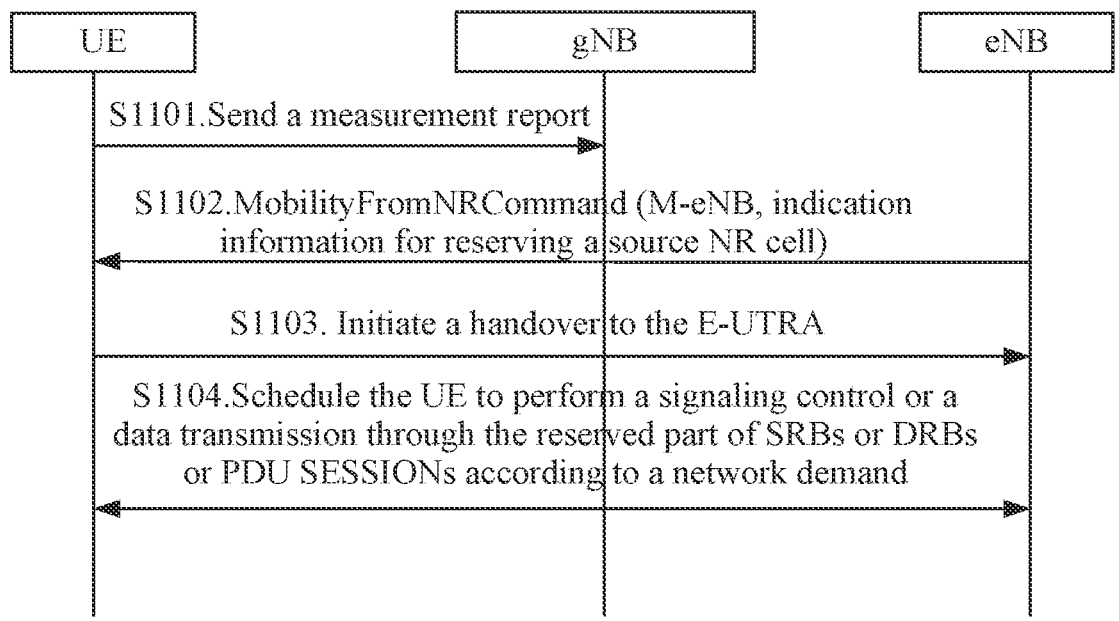
FIG. 11 is a flowchart of a method for a handover between 4G and 5G and between 5G SA mode and 5G NSA mode when a terminal initiates a voice call provided in an embodiment of the present application.

In an applicable implementation, FIG. 11 is a flowchart of a method for a terminal to handover between 4G and 5G and between 5G SA mode and 5G NSA mode provided in an embodiment of the present application. This embodiment involves three network nodes, a network node 1 is a UE; a network node 2 is a network NR gNB where the UE currently resides; and a network node 3 is an E-UTRA eNB of a target network to which the UE is handed over.

In S1101, the UE in an RRC connected state sends a measurement report to the gNB.

In S1102, the eNB sends a MobilityFromNRCommand message to notify the UE to handover to an EN-DC network; and the MobilityFromNRCommand message contains T-MN information (M-eNB) of an E-UTRA, and contains T-SN information (gNB).

In S1103, the terminal initiates a handover to the E-UTRA according to the MobilityFromNRCommand; after a cell handover to the E-UTRA is completed, if the T-SN is a source NR cell (i.e., the T-SN is a node of the source NR cell), part or all of radio bearers of the source NR cell are reserved. That the part or all of radio bearers of the source cell are reserved includes: part or all of original physical layer resource configurations are reserved, and part or all of SDAP entities or PDCP entities in SRB1, SRB2 and DRB are reserved; all or part of PDU SESSIONs in an NR network are reserved; for all or part of PDU SESSIONs, a connection reestablishment of a corresponding PDN CONNECTION is initiated in the EN-DC network.

In S1104, the eNB schedules the UE to perform a signaling control or a data transmission through the reserved part of SRBs or DRBs or PDU SESSIONs according to a network demand.

Figure 12:
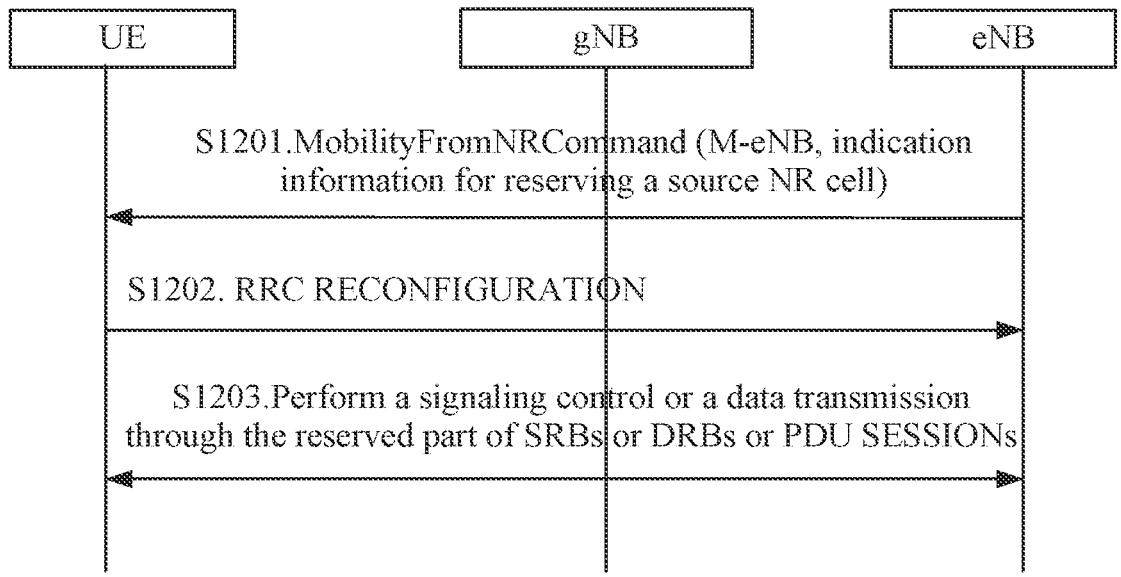
FIG. 12 is a flowchart of a method for a handover between 4G and 5G and between 5G SA mode and 5G NSA mode when a terminal initiates a voice call provided in an embodiment of the present application.

In an applicable implementation, FIG. 12 is a flowchart of a method for a handover between 4G and 5G and between 5G SA mode and 5G NSA mode when a terminal calls a called party provided in an embodiment of the present application. This embodiment involves three network nodes, a network node 1 is a UE; a network node 2 is an NR gNB of a network where the UE currently resides; and the network node 3 is an E-UTRA eNB of a target network to which the UE is handed over.

In S1201, the CN tries to initiate an IMS called voice call service for the UE in a connected state, and after it finds that the 5GS does not support the IMS Voice service, the eNB sends a MobilityFromNRCommand message to notify the UE in the connected state to handover to an EN-DC network; the MobilityFromNRCommand message contains T-MN information (M-eNB) of E-UTRA, and contains T-SN information.

In S1202, the terminal initiates a handover to the E-UTRA according to the MobilityFromNRCommand; and an RRC reconfiguration (RRCRECONFIGURATION) message is sent to the eNB.

If the terminal finds that the T-SN information is a current NR cell, after a cell handover to the E-UTRA is completed, part or all of radio resources of the source NR cell are reserved. That the part or all of radio resources of the source cell are reserved includes one of: part or all of original physical layer (L1) resource configurations are reserved, and part or all of SDAP entities or PDCP entities in SRB1, SRB2 and DRB are reserved; all or part of PDU SESSIONs in an NR network are reserved; for all or part of PDU SESSIONs, a connection reestablishment of a corresponding PDN CONNECTION is not initiated in the EN-DC network.

In S1203, the EN-DC network performs a signaling control or a data transmission through the reserved part of SRBs or DRBs or PDU SESSIONs.

Figure 13:
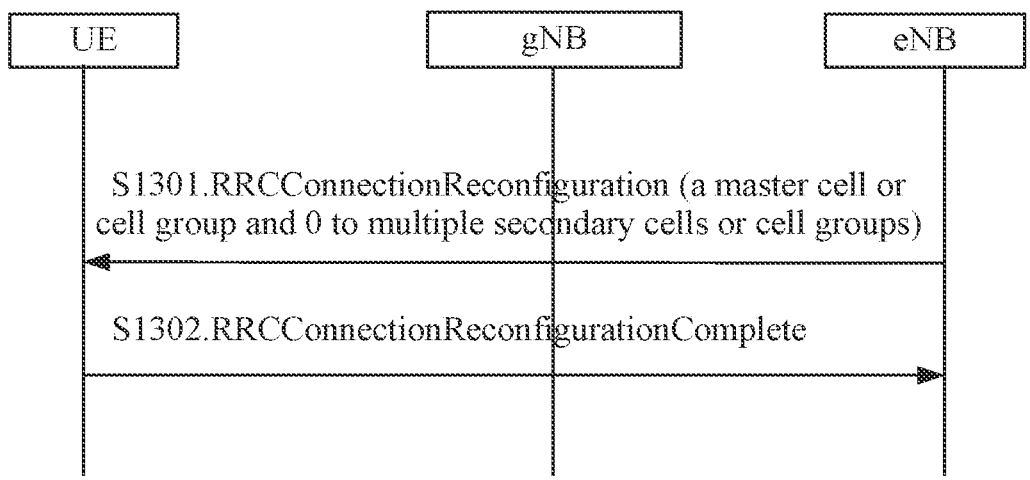
FIG. 13 is a flowchart of a network handover method performed by a terminal based on a measurement report of a current network provided in an embodiment of the present application.

In an applicable implementation, FIG. 13 is a flowchart of a network handover method performed by a terminal based on a measurement report of a current network provided in an embodiment of the present application, a UE is connected to an EN-DC 5G network in a connected state, a terminal and an NR node gNB are performing an enhanced mobile broadband (EMMB) service, and a network side discovers that the UE needs to perform an MN cell handover according to the measurement report of the current network; in order to ensure the continuity of an EMMB service, in particular, the continuity of PDU SESSION data; and the handover flow is as follows.

In S1301, an eNB sends an RRCConnectionReconfiguration message to notify the UE to handover to another EN-DC network; where the RRCConnectionReconfiguration message includes a master cell or cell group and 0 to multiple secondary cells or cell groups.

In S1302, the UE receives the RRCConnectionReconfiguration, initiates a handover to a target EN-DC cell indicated in the RRCConnectionReconfiguration, and sends an RRC connection reconfiguration complete message to the eNB of a target cell to complete handover from the NR cell to the EN-DC cell. The UE determines whether to reserve all or part of PDU SESSIONs of the current UE and the source cell (S-MN, gNB) according to a secondary cell or a cell group in RRCConnectionReconfiguration. If the master cell or cell group and the 0 to multiple secondary cells or cell groups are consistent with the source cell or cell group, then the all or part of PDU SESSIONs of the current UE and the source cell (S-MN, gNB) of part or all of the UE and the source cell are reserved.

The UE after the handover reserves the PDU SESSION of the S-MN of the source cell, the UE does not initiate a request to establish a new PDU SESSION based on an identifier (ID) and/or an Internet Protocol (IP) address and/or an access point name (APN) information of the PDU SESSION to establish the new PDU SESSION.

The UE receives and/or sends data through the reserved part or all of PDU SESSIONs.

Figure 14:
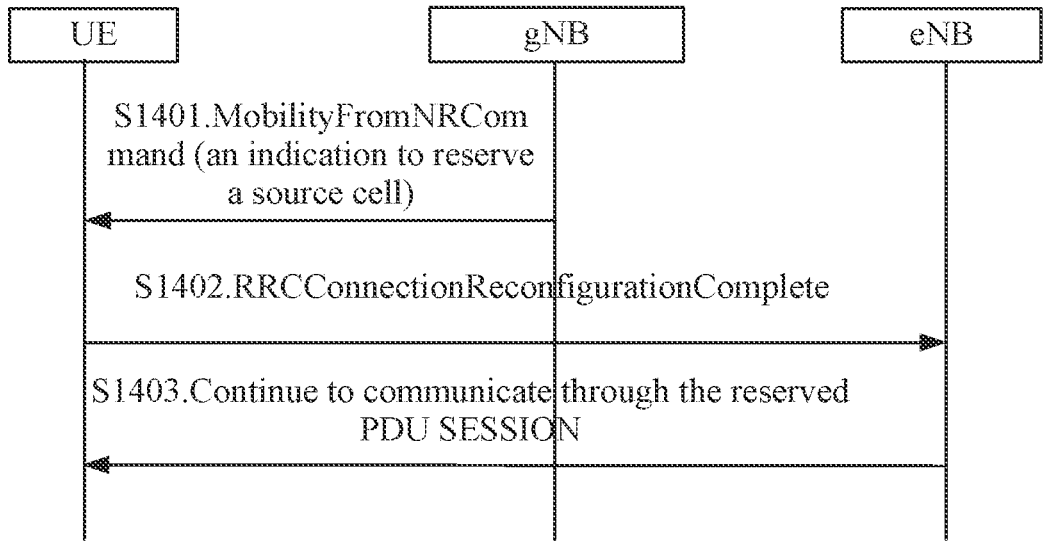
FIG. 14 is a flowchart of a network handover method performed by a terminal based on a measurement report of a current network provided in an embodiment of the present application.

In an application implementation, FIG. 14 is a flowchart of a network handover method performed by a terminal based on a measurement report of a current network provided in an embodiment of the present application, a UE is originally connected to an SA 5G network, and the UE is performing an MBB service, and at this time, a voice service (such as, answering a voice call or initiating a voice phone call) needs to be performed, but the 5G network cannot support the voice service, the UE needs to be handed over to an LTE network to establish a VoLTE service (based on a Voice of the LTE). Alternatively, the UE needs to continue the original MBB service, therefore, the UE is handed over to an EN-DC network, a VoLTE connection is established at an LTE RAN node, and an original MBB service connection is established at an NG-RAN node.

The UE is connected to a 5G base station (S-gNB), also referred to as a source node (S-node), of a source SA 5G network, and in a target EN-DC network to which the UE is handed over, a target master node (T-MN) is an LTE eNB, also referred to as Master eNB (MeNB), and a target secondary node (T-SN) is a 5G base station, that is, an NG-RAN node. When a target NG-RAN node is an original NR node, and the handover flow is as follows.

In S1401, the gNB sends a MobilityFromNRCommand message to notify the UE to handover to an EN-DC network; and the MobilityFromNRCommand message includes an indication to reserve a source cell (i.e., a source NR cell).

In S1402, the UE receives that the MobilityFromNRCommand initiates a handover to a target EN-DC cell, an RRCConnectionReconfigurationComplete message is sent to an e-NB of the target cell to complete a handover from an NR cell to an EN-DC cell. The UE determines whether to reserve all or part of PDU SESSIONs of the current UE and the source cell or cell group (S-MN, gNB) according to an indication of reserving the source cell in the MobilityFromNRCommand. If the indication information is that the source cell is reserved, then all or part of PDU SESSIONs of the UE and the auxiliary node S-SN of the source cell or the all or part of PDU SESSIONs of the current UE and the source cell (S-MN, gNB) are reserved.

In S1403, the EN-DC network continues to communicate through the reserved PDU SESSION.

After the UE receives the MobilityFromNRCommand message carrying the T-MN and the indication information of reserving the source cell, if the indication information is that the source cell is reserved, then a reestablishment is not initiated for the PDU SESSION of the reserved source cell.

The UE after the handover reserves the PDU SESSION of the S-MN of the source cell, the UE does not initiate a request to establish a new PDU SESSION based on an ID and/or an IP address and/or APN information of the PDU SESSION to establish the new PDU SESSION.

Figure 15:
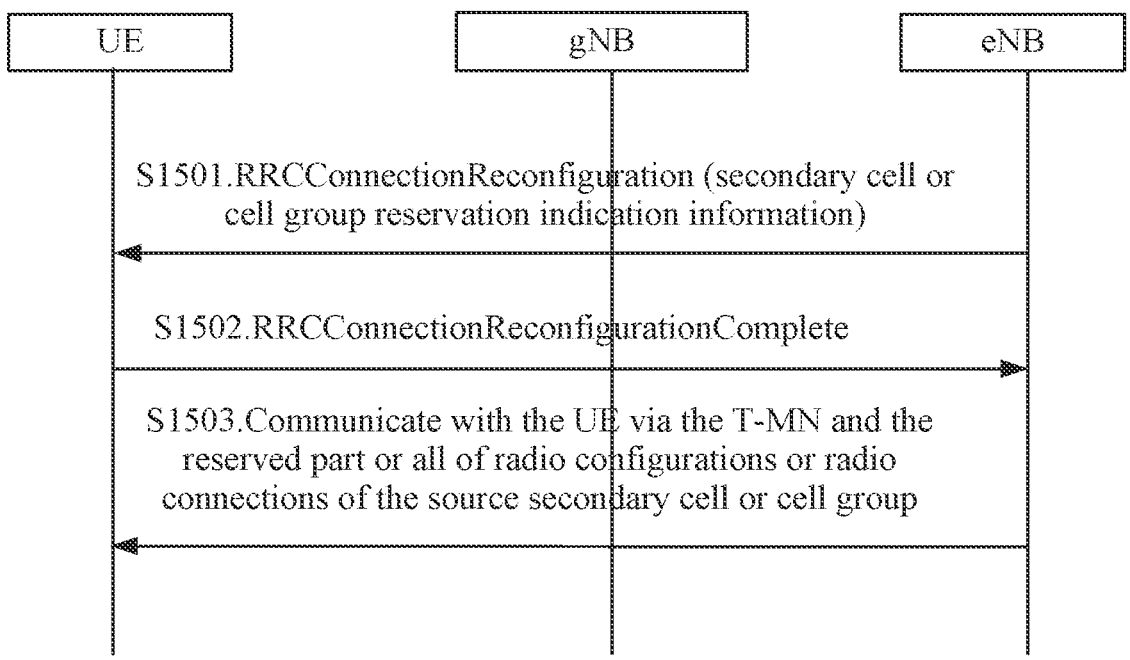
FIG. 15 is a flowchart of a network handover method performed by a terminal based on a measurement report of a current network provided in an embodiment of the present application.

In an application implementation, FIG. 15 is a flowchart of a network handover method performed by a terminal based on a measurement report of a current network provided in an embodiment of the present application. The UE is in a connected state and is connected to an EN-DC 5G network, and the terminal and the NR node gNB are performing an EMMB service. According to the measurement report of the current network, a network side finds that the UE needs to perform a handover of an MN cell. In order to ensure the continuity of an EMMB service, the network wants to maintain the current radio configuration or radio connection of an SN cell.

The handover flow is as follows.

In S1501, the eNB sends an RRCConnectionReconfiguration message to notify the UE to handover to another EN-DC network; where the RRCConnectionReconfiguration message includes secondary cell or cell group reservation indication information.

In S1502, the UE receives that the RRCConnectionReconfiguration initiates a handover to the target EN-DC cell, and the RRCConnectionReconfigurationComplete message is sent to the eNBs of the target cell to complete the handover from an NR cell to an EN-DC cell. The UE determines whether to reserve the radio configuration or radio connection between the current UE and the source secondary cell or cell group according to secondary cell or cell group reservation indication information in the RRCConnectionReconfiguration. If the indication information is the reserved secondary cell, then part or all of radio configurations or radio connections between the UE and the source secondary cell or cell group are reserved.

In S1503, the EN-DC network communicates with the UE via the T-MN and the reserved part or all of radio configurations or radio connections of the source secondary cell or cell group.

After the UE receives the RRCConnectionReconfiguration message carrying the secondary cell reservation indication information of the T-MN, if the indication information indicates that the secondary cell is reserved, then the UE does not initiate an update or reestablishment of a radio configuration or radio connection consistent with the information of the source secondary cell or cell group or of a radio configuration or radio connection of a secondary cell or cell group using the same network node.

After the UE receives the RRCConnectionReconfiguration message carrying the secondary cell reservation indication information of the T-MN, if the indication information indicates that the secondary cell is reserved, then the UE reserves part or all of radio resources with the source secondary cell or cell group.

The part or all of radio resources includes an L1 (physical layer) resource, an MAC resource, an SRB, a DRB, a PDCP entity, an SDAP entity.

The radio configuration includes part or all of L1 (physical layer) configurations, part or all of MAC layer configurations, part or all of RLC layer configurations, part or all of RRC layer configurations, part or all of PDCP layer configurations, part or all of NAS configurations.

Figure 16:
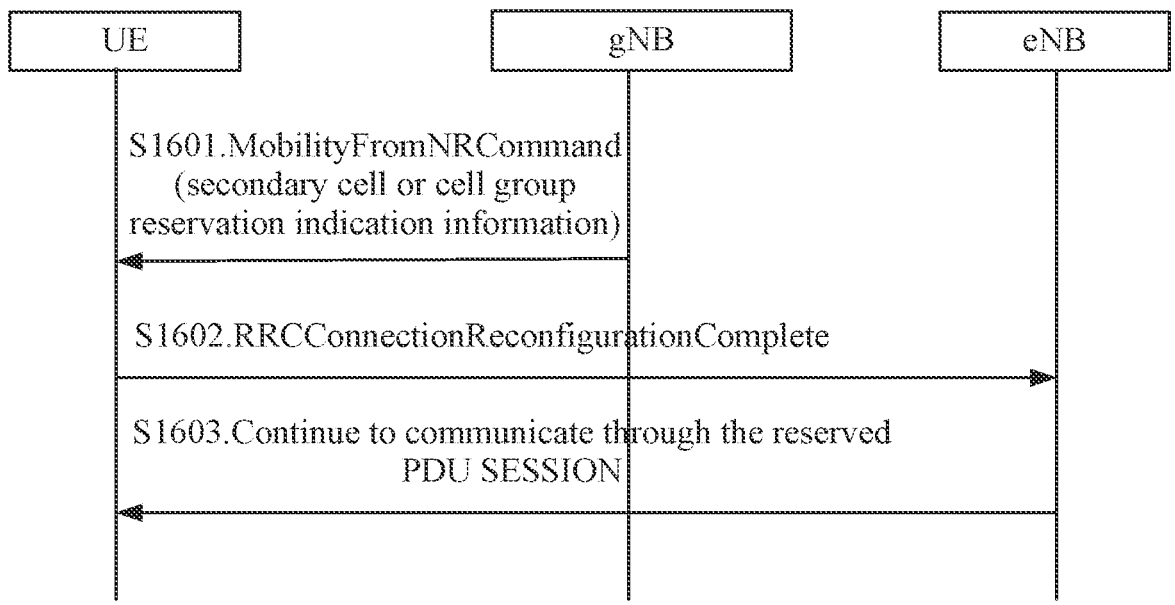
FIG. 16 is a flowchart of a network handover method performed by a terminal based on a measurement report of a current network provided in an embodiment of the present application.

In an application implementation, FIG. 16 is a flowchart of a network handover method performed by a terminal based on a measurement report of a current network provided in an embodiment of the present application. The UE is originally connected to an SA 5G network, and the UE is performing an MBB service, and at this time, the UE needs to perform a voice service (such as, answering a voice call or initiating a voice phone call) needs to be performed, but the 5G network cannot support the voice service, the UE needs to be handed over to an LTE network to establish a VoLTE service (a Voice based on the LTE), and the UE needs to continue the original MBB service. Therefore, the UE is handed over to the EN-DC network, a VoLTE connection is established at an LTE RAN node, and an original MBB service connection is established at an NG-RAN node.

In an NR network, it is necessary for the UE to establish a PDU SESSION for a data communication with the network, in order to maintain the data continuity during a network handover, generally, the UE releases the current PDU SESSION after the network handover and correspondingly establishes a new PDU SESSION or SESSION Description protocol CONNECTION (SDP CONNECTION) in a target cell; and at this time, the data transmission may be interrupted momentarily when the PDU session or the SDP CONNECTION is reestablished; in order to ensure higher data continuity, when the T-SN of the target cell is consistent with the S-MNRAN node or cell of the current cell, the procedure is as follows:

In S1601, the gNB sends a MobilityFromNRCommand message to notify the UE to handover to the EN-DC network, and the MobilityFromNRCommand message includes an PDU SESSION reservation indication.

In S1602, the UE receives the MobilityFromNRCommand, initiates a handover to a target EN-DC cell, and sends an RRCConnectionReconfigurationComplete message to an eNB of the target cell. The UE determines whether to reserve all or part of PDU SESSIONs between the current UE and a node (S-MN, gNB) of the source cell or cell group according to the PDU reservation indication information in the MobilityFromNRCommand. If the indication information is that the source cell is reserved, then the all or part of PDU SESSIONs of the UE and the auxiliary node S-SN of the source cell or the all or part of PDU SESSIONs of the current UE and the source cell (S-MN, gNB) are reserved.

In S1603, the EN-DC network continues to communicate through the reserved PDU SESSION.

After the UE receives the MobilityFromNRCommand message carrying the indication information of the T-MN and reservation of PDU SESSION, if the indication information is that the PDU is reserved, then no reestablishment is initiated for the PDU SESSION of the reserved source cell.

The PDU SESSION reservation indication information may be an indication of reserving PDU SESSION or a list of PDU SESSION information to be reserved.

The UE after the handover reserves the PDU SESSION of the S-MN of the source cell; and the UE does not initiate a request to establish a new PDU SESSION based on an ID and/or an IP address and/or APN information of the PDU SESSION to establish the new PDU SESSION.

In an applicable embodiment, this embodiment provides a UE supporting a handover between different networks, where the UE performs the following operations.

The UE receives a MobiltyFromNRCommand message of the NR, where the MobiltyFromNRCommand message includes source cell reservation indication information or cell or cell group information.

The UE determines whether to reserve all or part of PDU SESSIONs in the source network according to the source cell reservation indication information or a relation between the cell or cell group information and the source cell or cell group.

The UE continues to communicate through the reserved PDU SESSION.

The UE after the handover reserves a PDU SESSION with the S-MN of the source cell, the UE does not initiate a request to establish a new PDU SESSION based on an ID and/or an IP address and/or APN information of the PDU SESSION to establish the new PDU SESSION.

In an applicable implementation, this embodiment provides a UE supporting a handover between different networks, where the UE performs the following operations.

The UE receives a MobilityFromNRCommand message of the NR, where the mobility FromNRCommand message contains PDU SESSION reservation information.

The UE determines whether to reserve all or part of PDU SESSIONs in the source network according to the PDU SESSION reservation information.

The UE continues to communicate through the reserved PDU SESSION.

The UE after the handover reserves a PDU SESSION with the S-MN of the source cell, the UE does not initiate a request to establish a new PDU SESSION based on an ID and/or an IP address and/or APN information of the PDU SESSION to establish the new PDU SESSION.

The PDU SESSION reservation information may be: an indication to reserve a PDU session; or a PDU SESSION information list to be reserved; and the PDU SESSION information list includes at least one piece of PDU SESSION information.

In an applicable implementation, this embodiment provides a network node (source node) supporting a handover between different networks: a MobilityFromNRCommand or RRCCONNECTION RECONFIGURATION message is sent, where the MobilityFromNRCommand or RRCCONNECTION RECONFIGURATION message includes source cell reservation indication information, or cell or cell group information, or PDU SESSION reservation information, or DRB reservation information.

The cell reservation indication information is used for instruct the terminal to reserve all or part of radio connections or radio configurations of the source cell after the handover.

The cell or cell information may be used for instructing the terminal to reserve all or part of radio connections or radio configurations of the source cell after the handover.

The cell reservation indication information may be used for instructing the terminal to reserve all or part of radio connections or radio configurations of the source cell after the handover.

The DRB reservation information is used for instructing the terminal to reserve part or all of DRBs after a cell handover.

The cell or cell information may be used for instructing the terminal to reserve all or part of radio resource configurations, all or part of radio connections, or all or part of PDU SEESSIONs of the source cell after the handover.

The PDU SESSION reservation information is used for instructing the terminal to reserve all or part of radio resource configurations, all or part of radio connections, or all or part of PDU SEESSIONs of the source cell.

In an applicable implementation, this embodiment provides a network node (a target network core network element) supporting a handover between different networks: after an RRCCONNECTION RECONFIGURATION message sent by a terminal reserving part or all of source cell radio connections or radio resources is received, and the network performs a data communication through part or all of reserved radio connections or radio configurations.

In an applicable implementation, this embodiment provides a network node (target network core network element) supporting a handover between different networks: after an RRCCONNECTION RECONFIGURATION message, sent by a terminal, for reserving the PDU SESSION is received, the network performs a data communication through the reserved part or all of PDU SESSIONs.

Figure 17:
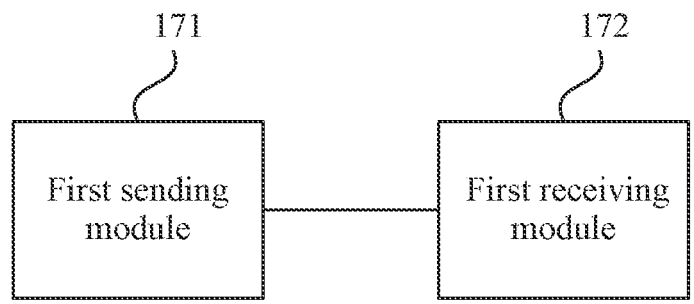
FIG. 17 is a schematic structural diagram of a network handover apparatus provided in an embodiment of the present application.

In an embodiment, an embodiment of the present application provides a network handover apparatus, and FIG. 17 is a schematic structural diagram of a network handover apparatus provided in an embodiment of the present application. The apparatus may be suitable for a case that a UE continues to use original radio resources before and after a network handover. The network handover apparatus may be implemented by software and/or hardware, and the method is applied in a first communication node.

As shown in FIG. 17, the network handover apparatus provided in the embodiment of the present application mainly includes a first sending module 171 and a first receiving module 172.

The first sending module 171 is configured to send a handover required message to a core network, where the handover required message carries reference information of UE context at a source side.

The first receiving module 172 is configured to receive a handover control message sent by the core network, where the handover control message carries information for maintaining the UE context at the source side, and the information for maintaining the UE context at the source side is used for instructing a network node at the source side not to release resources used by a UE, and the information for maintaining the UE context at the source side is determined by the reference information of the UE context at the source side.

In an exemplary implementation, in a case where the network handover is a handover from an SA 5G network to an EN-DC network, the first receiving module 172 is further configured to receive a secondary node addition request message sent by a second communication node before the handover control message sent by the core network is received, where the secondary node addition request message carries the reference information of the UE context at the source side, and the first sending module 171 is further configured to send a secondary node addition acknowledge message to the second communication node, where the secondary node addition acknowledge message is used for acknowledging a target node that the UE establishes a dual connectivity under the EN-DC network.

In an exemplary implementation, the reference information of the UE context at the source side includes a source 5G radio access network node (Source NG-RAN node) and/or a radio access network terminal NG interface application protocol identifier (RAN UE NGAP ID).

In an exemplary implementation, the reference information of the UE context at the source side carried in the secondary node addition request message is sent by the core network to the second communication node.

In an exemplary implementation, in a case where the network handover is a handover from the SA 5G network to the EN-DC network, the first communication node is a 5G base station in the SA 5G network, and the second communication node is an LTE eNB in the EN-DC network.

In an exemplary implementation, in a case where a network handover is a handover from the EN-DC network to the SA 5G network, the first sending module 171 is further configured to, after the handover control message sent by the core network is received, send a secondary node addition request message to a second communication node, where the secondary node addition request message carries the reference information of the UE context at the source side, and the first receiving module 172 is further configured to receive a secondary node addition acknowledge message sent by the second communication node, where the secondary node addition acknowledge message is used for acknowledging that the UE establishes a dual connectivity under the EN-DC network.

In an exemplary implementation, the first sending module 171 is configured to send a third message to a third communication node in a case where it is determined that the resources used by the UE is reserved, where the third message carries radio resource indication information.

In an exemplary implementation, the first sending module 171 is configured to, in a case where the network handover is a handover from the SA 5G network to the EN-DC network, send a UE release complete message to the core network, and then send a UE release message to the second communication node, where the UE release message is used for instructing the second communication node to release a signaling connection between the second communication node and the node.

In an exemplary implementation, the reference information of the UE context at the source side includes an SN UE X2AP ID information element.

In an exemplary implementation, in a case where the network handover is a handover from the EN-DC network to the SA 5G network, the first communication node is an LTE eNB in the EN-DC network, and the secondary node is a 5G base station in the SA 5G network.

The network handover apparatus provided in this embodiment may perform the network handover method provided in any of the embodiments of the present application, and has a corresponding function module for performing the method. Technical details not described in this embodiment may refer to the network handover method provided in any of the embodiments of the present application.

In the above-described embodiments of the network handover apparatus, each unit and module included in the network handover apparatus are only divided according to functional logic, but are not limited to the above-described divisions, so long as corresponding functions may be realized, and the names of the function units are also only to facilitate distinguishing from each other and are not intended to limit the scope of protection of the present application.

Figure 18:
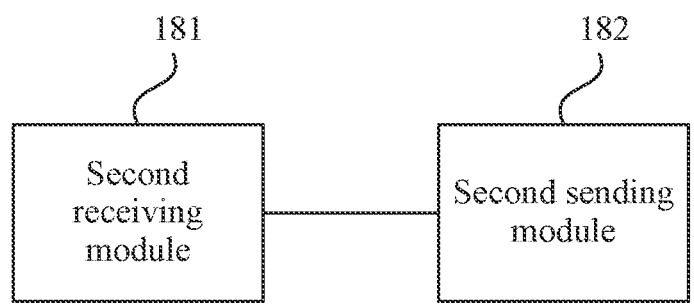
FIG. 18 is a schematic structural diagram of a network handover apparatus provided in an embodiment of the present application.

In an embodiment, an embodiment of the present application provides a network handover apparatus, and FIG. 18 is a schematic structural diagram of a network handover apparatus provided in an embodiment of the present application. The apparatus may be suitable for a case that a UE continues to use original radio resources before and after a network handover. The network handover apparatus may be implemented by software and/or hardware, and the method is applied in a second communication node.

As shown in FIG. 18, the network handover apparatus provided in the embodiment of the present application mainly includes a second receiving module 181 and a second sending module 182.

The second receiving module 181 is configured to receive a handover request message sent by a core network, where the handover request message carries reference information of UE context at a source side.

The second sending module 182 is configured to send a handover request acknowledge message to the core network, where the handover request acknowledge message carries information for maintaining the UE context at the source side, the information for maintaining the UE context at the source side is used for instructing a network node at the source side not to release resources used by a UE, and the information for maintaining the UE context at the source side is determined by the reference information of the UE context at the source side.

In an exemplary implementation, the second sending module 182 is configured to, in a case where a network handover is from an SA 5G network to an EN-DC network, after the handover request message sent by the core network is received, send a secondary node addition request message to a first communication node, where the secondary node addition request message carries the reference information of the UE context at the source side, and the second receiving module 181 is configured to receive a secondary node addition acknowledge message sent by the first communication node, where the secondary node addition acknowledge message is used for acknowledging a target node that the UE establishes a dual connectivity under the EN-DC network.

In an exemplary implementation, the second receiving module 181 is configured to receive the secondary node addition request message sent by the first communication node in a case where the network handover is a handover from the EN-DC network to the SA 5G network, where the secondary node addition request message carries the reference information of the UE context at the source side, and the second sending module 182 is configured to send the secondary node addition acknowledge message to the first communication node, where the secondary node addition acknowledge message is used for acknowledging that the UE establishes the dual connectivity under the EN-DC network.

In an exemplary implementation, the second receiving module 181 is configured to receive a UE release message sent by a first communication node in a case where the network handover is a handover from an SA 5G network to an EN-DC network, where the UE release message is used for instructing the second communication node to release a signaling connection between the second communication node and the first communication node.

The network handover apparatus provided in this embodiment may perform the network handover method provided in any of the embodiments of the present application, and has a corresponding function module for performing the method. Technical details not described in this embodiment may refer to the network handover method provided in any of the embodiments of the present application.

In the above-described embodiments of the network handover apparatus, each unit and module included in the network handover apparatus are only divided according to functional logic, but are not limited to the above-described divisions, so long as corresponding functions may be realized, and the names of the function units are also only to facilitate distinguishing from each other and are not intended to limit the scope of protection of the present application.

Figure 19:
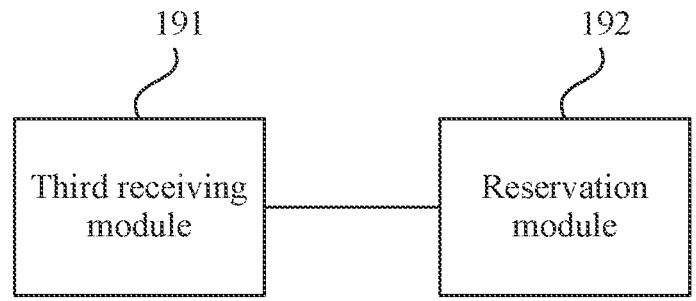
FIG. 19 is a schematic structural diagram of a network handover apparatus provided in an embodiment of the present application.

In an embodiment, an embodiment of the present application provides a network handover apparatus, and FIG. 19 is a schematic structural diagram of a network handover apparatus provided in an embodiment of the present application. The apparatus may be suitable for a case that a UE continues to use original radio resources before and after a network handover. The network handover apparatus may be implemented by software and/or hardware, and the method is applied in a third communication node.

As shown in FIG. 19, the network handover apparatus provided in the embodiment of the present application mainly includes a third receiving module 191 and a reservation module 192.

The third receiving module 191 is configured to receive a third message, where the third message carries radio resource indication information.

The reservation module 192 is configured to reserve part or all of radio resources of a source cell according to the radio resource indication information.

In an exemplary implementation, the third message is sent by a first communication node.

In an exemplary implementation, the third message is an RRC reconfiguration message, or the third message is a radio control message.

In an exemplary implementation, the radio resource indication information includes source cell reservation indication information, or secondary cell information, or reservation PDU session information, or an NAS resource reservation indication, or a suspend indication, or QoS flow reservation information.

In an exemplary implementation, the QoS flow reservation information is used for indicating that a QoS flow or QoS flow information is reserved after a network handover.

In an exemplary implementation, the source cell reservation indication information is used for indicating that the part or all of radio resources of the source cell are reserved after a network handover.

In an exemplary implementation, the secondary cell information is used for indicating that the part or all of radio resources of the source cell are reserved after a network handover based on a relationship of the secondary cell information and source cell information.

In an exemplary implementation, the secondary cell information is information of a single secondary cell or a list of secondary cells.

In an exemplary implementation, the NAS resource reservation indication is used for indicating that part or all of NAS resources of the source cell are reserved after a network handover, where the part or all of NAS resources include one or more: a registration status of a UE, TAU information, or integrity and ciphering information.

In an exemplary implementation, the suspend indication is used for indicating that the part or all of radio resources of the source cell are reserved after a network handover.

In an exemplary implementation, the part or all of radio resources include part or all of radio connections, where the radio connection includes at least one of: an RRC connection, an SRB, a DRB, a PDU session context, an NAS layer connection.

In an exemplary implementation, the part or all of radio resources include part or all of radio configurations, where the radio configuration includes at least one of: a L1 (physical layer) configuration, an MAC layer configuration, an RLC layer configuration, an RRC layer configuration, a PDCP layer configuration, or an NAS layer configuration.

In an exemplary implementation, the reservation PDU session information is used for indicating that a PDU session is reserved after a network handover.

In an exemplary implementation, the reservation PDU session information includes PDU session reservation indication information or an information list of PDU sessions to be reserved; where the information list of the PDU sessions includes information of one or more PDU sessions.

In an exemplary implementation, the reservation module 192 is configured to: continue to use a downlink bandwidth part (BWP); and receive downlink data sent by a PDSCH according to RIV indication information in downlink control information (DCI).

In an exemplary implementation, if $(L_{CRBs}-1) \leq \lfloor N_{RB}^{DL}/2 \rfloor$ is satisfied, then $RIV = N_{RB}^{DL}(L_{CRBs}-1) + RB_{start}$; and if $(L_{CRBs}-1) \leq \lfloor N_{RB}^{DL}/2 \rfloor$ is not satisfied, then $RIV = N_{RB}^{DL}(N_{RB}^{DL}-L_{CRBs}+1) + (N_{RB}^{DL}-1-RB_{start})$, where $L_{CRBs}$ is a length of consecutive RBs, $N_{RB}^{DL}$ is NE is a number of RBs of a downlink bandwidth, and $RB_{start}$ is a starting resource block in the downlink bandwidth.

In an exemplary implementation, the reservation module 192 is configured to: reserve a C-RNTI of a UE, where the C-RNTI of the UE is used for receiving DCI information.

In an exemplary implementation, the reservation module 192 is configured to: reserve a resource allocation manner of a physical uplink control channel (PUCCH); and/or reserve an allocated PUCCH resource set.

In an exemplary implementation, the reservation module 192 is configured to: reserve one or more data radio bearers (DRBs); reserve one or more signaling radio bearers (SRBs); and modify one of an SRB1 or an SRB2 to an SRB3.

In an exemplary implementation, the reservation module 192 is configured to: continue to use an original PDU session for a data transmission; or after the PDU session is initiated by a first communication node, reestablish and recover a data connection.

In an exemplary implementation, the reservation module 192 is configured to use a security context before a network handover.

In an exemplary implementation, the reservation module 192 is configured to reserve a DCCH.

In an exemplary implementation, the reservation module 192 is configured to continue to send and receive data according to the DCCH.

In an exemplary implementation, the reservation module 192 is configured to reserve part of QOS flows or QOS flow information, or reserving all of QOS flows or QOS flow information.

In an exemplary implementation, the reservation module 192 is configured to continue to use the QOS flow and/or the QOS flow information to perform a data sending and/or receiving of a user plane.

The network handover apparatus provided in this embodiment may perform the network handover method provided in any of the embodiments of the present application, and has a corresponding function module for performing the method. Technical details not described in this embodiment may refer to the network handover method provided in any of the embodiments of the present application.

In the above-described embodiments of the network handover apparatus, each unit and module included in the network handover apparatus are only divided according to functional logic, but are not limited to the above-described divisions, so long as corresponding functions may be realized, and the names of the function units are also only to facilitate distinguishing from each other and are not intended to limit the scope of protection of the present application.

Figure 20:
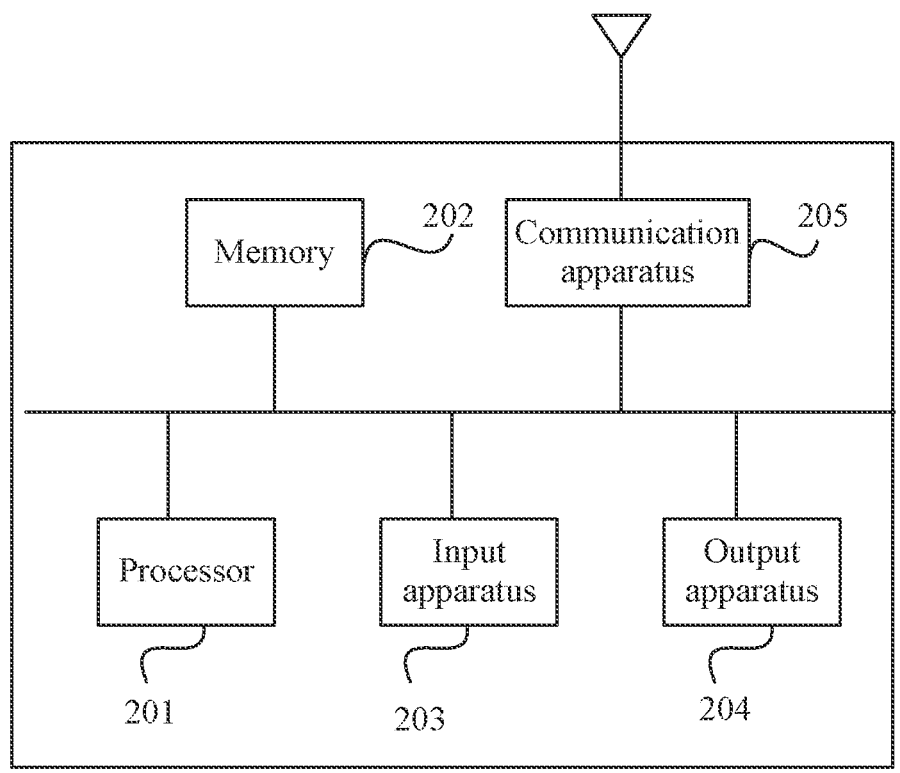
FIG. 20 is a schematic structural diagram of a device provided in an embodiment of the present application.

An embodiment of the present application further provides a device. FIG. 20 is a schematic structural diagram of a device provided in an embodiment of the present application, as shown in FIG. 20, the device includes a processor 201, a memory 202, an input apparatus 203, an output apparatus 204 and a communication apparatus 205. A number of processors 201 in the device may be one or more, one processor 201 is used as an example in FIG. 20; the processor 201, the memory 202, the input apparatus 203 and the output apparatus 204 in the device may be connected by a bus or in other manners, for example, they are connected by the bus in FIG. 20.

The memory 202 serves as a computer-readable storage medium and may be used for storing a software program, a computer executable program and a module, such as a program instruction/module corresponding to the network handover method in the embodiments of the present application (such as, the first sending module 171 and the first receiving module 172 in the network handover apparatus), or a program instruction/module corresponding to the network handover method in the embodiments of the present application (such as, the second receiving module 181 and the second sending module 182 in the network handover apparatus), or a program instruction/module corresponding to the network handover method in the embodiments of the present application (such as, the third receiving module 191 and the reservation module 192 in the network handover apparatus). The processor 201 executes various function applications and data processing of the device, i.e., implements any one of the methods provided in the embodiments of the present application, by executing software programs, instructions, and modules stored in the memory 202.

The memory 202 mainly includes a storage program region and a storage data region, where the storage program region may store an operating system, an application program required for at least one function; the storage data region may store data or the like created according to the use of the device. The memory 202 may include a high-speed random access memory and may also include a non-volatile memory, such as at least one magnetic disk storage device, flash memory device, or other non-volatile solid-state memory devices. In some instances, the memory 202 may include a memory remotely disposed with respect to the processor 201, these remote memories may be connected to the device over a network. Instances of above-described networks include, but are not limited to, an Internet, an intranet, a local area network, a mobile communication network, and combinations thereof.

The input apparatus 203 may be configured to receive entered numeric or character information and generate key signal inputs related to user settings and function controls of the device. The output apparatus 204 may include a display device such as a display screen.

The communication apparatus 205 may include a receiver and a transmitter. The communication apparatus 205 is configured to perform an information transceiving communication according to the control of the processor 201.

In a case where the above-described device is a first communication node, the processor 201 executes various function applications and data processing by running programs stored in the system memory 202, for example, implements the network handover method provided in the embodiments of the present application, the method is applied to the first communication node, and the method includes: a handover required message is sent to a core network, where the handover required message carries reference information of UE context at a source side; and a handover control message sent by the core network is received, where the handover control message carries information for maintaining the UE context at the source side, and the information for maintaining the UE context at the source side is used for instructing a network node at the source side not to release resources used by a UE, and the information for maintaining the UE context at the source side is determined by the reference information of the UE context at the source side.

As will be understood by those skilled in the art, the processor 201 may also implement the technical schemes of the network handover information method provided in any of the embodiments of the present application. The hardware structure and the function of the device may be explained with reference to the contents of this embodiment.

In a case where the above-described device is a second communication node, the processor 201 executes various function applications and data processing by running programs stored in the system memory 202, for example, implements the network handover method provided in the embodiments of the present application, the method is applied to the second communication node, and the method includes: a handover request message sent by a core network is received, where the handover request message carries reference information of UE context at a source side; and a handover request acknowledge message is sent to the core network, where the handover request acknowledge message carries information for maintaining the UE context at the source side, the information for maintaining the UE context at the source side is used for instructing a network node at the source side not to release resources used by a UE, and the information for maintaining the UE context at the source side is determined by the reference information of the UE context at the source side.

As will be appreciated by those skilled in the art, the processor 201 may also implement the technical schemes of the network handover method provided in any of the embodiments of the present application. The hardware structure and the function of the device may be explained with reference to the contents of this embodiment.

In a case where the above-described device is a third communication node, the processor 201 executes various function applications and data processing by running programs stored in the system memory 202, for example, implements the network handover method provided in the embodiments of the present application, the method includes: a third message is received, where the third message carries radio resource indication information; and part or all of radio resources of a source cell are reserved according to the radio resource indication information.

As will be appreciated by those skilled in the art, the processor 201 may also implement the technical schemes of the network handover method provided in any of the embodiments of the present application. The hardware structure and the function of the device may be explained with reference to the contents of this embodiment.

An embodiment of the present application further provides a storage medium including a computer-executable instruction. The computer-executable instruction is configured to perform, when executed by a computer processor, the network handover method, the method is applied to a first communication node, and the method includes: a handover required message is sent to a core network, where the handover required message carries reference information of UE context at a source side; and a handover control message sent by the core network is received, where the handover control message carries information for maintaining the UE context at the source side, and the information for maintaining the UE context at the source side is used for instructing a network node at the source side not to release resources used by a UE, and the information for maintaining the UE context at the source side is determined by the reference information of the UE context at the source side.

According to the storage medium including the computer-executable instruction provided in the embodiments of the present application, the computer-executable instruction is configured to implement operations not limited to the network handover method described above, but also configured to implement relevant operations in the network handover method provided in any of the embodiments of the present application.

An embodiment of the present application further provides a storage medium including a computer-executable instruction. The computer-executable instruction is configured to perform, when executed by a computer processor, the network handover method, the method is applied to a second communication node, and the method includes: a handover request message sent by a core network is received, where the handover request message carries reference information of UE context at a source side; and a handover request acknowledge message is sent to the core network, where the handover request acknowledge message carries information for maintaining the UE context at the source side, the information for maintaining the UE context at the source side is used for instructing a network node at the source side not to release resources used by a UE, and the information for maintaining the UE context at the source side is determined by the reference information of the UE context at the source side.

According to the storage medium including the computer-executable instruction provided in the embodiments of the present application, the computer-executable instruction is configured to perform operations not limited to the network handover method described above, but also configured to implement relevant operations in the network handover method provided in any of the embodiments of the present application.

An embodiment of the present application further provides a storage medium including a computer-executable instruction. The computer-executable instruction is configured to perform, when executed by a computer processor, the network handover method, the method includes: a third message is received, where the third message carries radio resource indication information; and part or all of radio resources of a source cell are reserved according to the radio resource indication information.

According to the storage medium including the computer-executable instruction provided in the embodiments of the present application, the computer-executable instruction is configured to perform operations not limited to the network handover method described above, but also configured to implement relevant operations in the network handover method provided in any of the embodiments of the present application.

Those skilled in the art will appreciate from the above description of the implementations that the present application may be implemented by means of software and general purpose hardware, and of course may also be implemented by hardware. Based on this understanding, the technical scheme of the present application may be embodied in the form of a software product, and the computer software product may be stored in a computer readable storage medium, such as a floppy disk of a computer, a read-only memory (ROM), a random access memory (RAM), a flash memory (FLASH), a hard disk or an optional disk, including multiple instructions to enable a computer device (which may be a personal computer, a server, or a network device, etc.) to perform the method of the embodiments of the present application.

The above description is only an exemplary embodiment of the present application, and is not intended to limit the scope of protection of the present application.

Those skilled in the art will appreciate that the term user equipment covers any suitable type of wireless user equipment such as a mobile phone, a portable data processing apparatus, a portable web browser or a vehicle-mounted mobile station.

In general, various embodiments of the present application may be implemented in hardware or special purpose circuits, software, logic or any combination thereof. For example, some aspects may be implemented in hardware, while other aspects may be implemented in firmware or software which may be executed by a controller, a microprocessor or other computing devices, although the present application is not limited thereto.

Embodiments of the present application may be implemented by a data processor of a mobile device executing computer program instructions, for example in a processor entity, or by hardware, or by a combination of software and hardware. The computer program instructions may be assembler instructions, instruction set architecture (ISA) instructions, machine instructions, machine-related instructions, microcode, firmware instructions, state setting data, or source or object codes written in any combination of one or more programming languages.

Any block diagram of the logic flow in the accompanying drawings of the present application may represent program processes, or may represent interconnected logic circuits, modules, and functions, or may represent a combination of program processes and logic circuits, modules, and functions. The computer program may be stored on a memory. The memory may be of any type suitable for the local technical environment and may be implemented using any suitable data storage technology, such as, but not limited to, a read-only memory (ROM), a random access memory (RAM), an optical memory device and system (digital versatile disc (DVD) or compact disk (CD)), etc. Computer readable media may include non-instantaneous storage media. Data processors may be of any type suitable for the local technical environment, such as, but not limited to, general-purpose computers, specialized computers, microprocessors, digital signal processors (DSP), application specific integrated circuits (ASIC), field programmable gate array (FPGA)), and processors based on multi-core processor architectures.

What is claimed is:

1. A network handover method, applied to a first communication node, comprising:
sending a handover required message to a core network, wherein the handover required message carries reference information of UE context at a source side;
receiving a handover control message sent by the core network, wherein the handover control message carries information for maintaining the UE context at the source side, and the information for maintaining the UE context at the source side is used for instructing a network node at the source side not to release resources used by a UE, and the information for maintaining the UE context at the source side is determined by the reference information of the UE context at the source side;
wherein in a case where a network handover is from a stand-alone 5th generation mobile communication technology (SA 5G) network to an evolved universal terrestrial radio access and new radio-dual connectivity (EN-DC) network, before receiving the handover control message sent by the core network, the method further comprises:
receiving a secondary node addition request message sent by a second communication node, wherein the secondary node addition request message carries the reference information of the UE context at the source side; and
sending a secondary node addition acknowledge message to the second communication node, wherein the secondary node addition acknowledge message is used for acknowledging a target node that the UE establishes a dual connectivity under the EN-DC network; or
wherein in a case where a network handover is a handover from an evolved universal terrestrial radio access and new radio-dual connectivity (EN-DC) network to a stand-alone 5th generation mobile communication technology (SA 5G) network, after receiving the handover control message sent by the core network, the method further comprises:
sending a secondary node release request message to a second communication node, wherein the secondary node release request message carries UE context at source kept information; and
receiving a secondary node release request acknowledge message sent by the second communication node.

2. The method of claim 1, wherein the reference information of the UE context at the source side comprises at least one of a source next generation radio access network node (Source NG-RAN node) or a radio access network user equipment next generation interface application protocol identifier (RAN UE NGAP ID).

3. The method of claim 1, wherein the reference information of the UE context at the source side carried in the secondary node addition request message is sent by the core network to the second communication node.

4. The method of claim 1, wherein in the case where the network handover is a handover from the SA 5G network to the EN-DC network, the first communication node is a 5G base station in the SA 5G network, and the second communication node is a long term evolution evolved node B (LTE eNB) in the EN-DC network.

5. The method of claim 1, in a case where it is determined that the resources used by the UE is reserved, the method further comprises:
sending a third message to a third communication node, wherein the third message carries radio resource indication information; or
wherein in the case where the network handover is a handover from the EN-DC network to the SA 5G network, the first communication node is an LTE eNB in the EN-DC network, and the secondary node is a 5G base station in the SA 5G network.

6. The method of claim 1,
wherein in the case where the network handover is a handover from the EN-DC network to the SA 5G network, the method further comprises:
sending a UE release complete message to the core network; and
sending a UE release message to the second communication node, wherein the UE release message is used for instructing the second communication node to release a signaling connection between the second communication node and the first communication node; or
wherein the reference information of the UE context at the source side comprises a secondary node user equipment X2 interface application protocol identifier (SN UE X2AP ID) information element.

7. An apparatus, comprising:
at least one processor;
a memory, which is configured to store at least one program;
wherein the at least one program, when executed by the at least one processor, causes the at least one processor to implement the method of claim 1.

8. A network handover method, applied to a second communication node, comprising:
receiving a handover request message sent by a core network, wherein the handover request message carries reference information of UE context at a source side; and
sending a handover request acknowledge message to the core network, wherein the handover request acknowledge message carries information for maintaining the UE context at the source side, the information for maintaining the UE context at the source side is used for instructing a network node at the source side not to release resources used by a UE, and the information for maintaining the UE context at the source side is determined by the reference information of the UE context at the source side;
wherein in a case where a network handover is a handover from a stand-alone 5th generation mobile communication technology (SA 5G) network to an evolved universal terrestrial radio access and new radio-dual connectivity (EN-DC) network, after receiving the handover request message sent by the core network, the method further comprises:
sending a secondary node addition request message to a first communication node, wherein the secondary node addition request message carries the reference information of the UE context at the source side; and receiving a secondary node addition acknowledge message sent by the first communication node, wherein the secondary node addition acknowledge message is used for acknowledging a target node that the UE establishes a dual connectivity under the EN-DC network; or wherein in a case where the network handover is a handover from the EN-DC network to the SA 5G network, the method further comprises:

receiving a secondary node release request message sent by the first communication node, wherein the secondary node release request message carries UE context at source kept information; and sending a secondary node release request acknowledge message to the first communication node.

9. The method of claim 8, wherein in the case where the network handover is a handover from the EN-DC network to the SA 5G network, the method further comprises:

receiving a UE release message sent by a first communication node, wherein the UE release message is used for instructing the second communication node to release a signaling connection between the second communication node and the first communication node.

10. An apparatus, comprising:

at least one processor;

a memory, which is configured to store at least one program;

wherein the at least one program, when executed by the at least one processor, causes the at least one processor to implement the method of claim 8.

11. A network handover method, applied to a third communication node, comprising:

receiving a third message, wherein the third message carries radio resource indication information; and reserving part or all of radio resources of a source cell according to the radio resource indication information;

wherein the radio resource indication information comprises secondary cell information, wherein the secondary cell information is used for indicating that the part or all of radio resources of the source cell are reserved based on a relationship of the secondary cell information and source cell information after a network handover;

wherein the secondary cell information is information of a single secondary cell or a list of secondary cells; and wherein reserving the part or all of radio resources comprises:

continuing to use a downlink bandwidth part (BWP); and receiving downlink data sent by a physical downlink shared channel (PDSCH) according to resource indication value (RIV) indication information in downlink control information (DCI); and wherein in a case $(L_{CRBs}-1) \leq \lfloor N_{RB}^{DL}/2 \rfloor$ is satisfied, $RIV = N_{RB}^{DL}(L_{CRBs}-1) + RB_{start}$, and in a case where $(L_{CRBs}-1) \leq \lfloor N_{RB}^{DL}/2 \rfloor$ is not satisfied, $RIV = N_{RB}^{DL}(N_{RB}^{DL} - L_{CRBs} + 1) + (N_{RB}^{DL} - 1 - RB_{start})$, where $L_{CRBs}$ is a length of consecutive resource blocks (RBs), $N_{RB}^{DL}$ is a number of RBs of a downlink bandwidth, and $RB_{start}$ is a starting resource block in the downlink bandwidth.

12. The method of claim 11, wherein the part or all of radio resources comprise part or all of radio connections, wherein the radio connection comprises at least one of: an RRC connection, a signaling radio bearer (SRB), a data radio bearer (DRB), a PDU session context, or an NAS layer connection; or wherein the part or all of radio resources comprise part or all of radio configurations, wherein the radio configuration comprises at least one of: a physical layer configuration, a media access control (MAC) layer configuration, a radio link control (RLC) layer configuration, an RRC layer configuration, a packet data convergence protocol (PDCP) layer configuration, or an NAS layer configuration.

13. An apparatus, comprising:

at least one processor;

a memory, which is configured to store at least one program;

wherein the at least one program, when executed by the at least one processor, causes the at least one processor to implement the method of claim 11.

* * * * *